United States Patent [19]

Ueda

[11] Patent Number: 5,276,718
[45] Date of Patent: Jan. 4, 1994

[54] CONTROL BLADE FOR NUCLEAR REACTOR

[75] Inventor: Makoto Ueda, Yokohama, Japan

[73] Assignee: Kabushiki Kaisha Toshiba, Kawasaki, Japan

[21] Appl. No.: 721,677

[22] Filed: Jun. 26, 1991

[30] Foreign Application Priority Data

Jun. 26, 1990 [JP] Japan .................................. 2-170827
Jul. 10, 1990 [JP] Japan .................................. 2-180465

[51] Int. Cl.$^5$ .............................................. G21C 7/00
[52] U.S. Cl. .................................. 376/220; 376/239; 376/339
[58] Field of Search ................ 376/239, 339, 220, 333, 376/328

[56] References Cited

U.S. PATENT DOCUMENTS

4,664,878 5/1987 Wilson ................................ 376/328
5,034,185 7/1991 Ueda ................................... 376/333

FOREIGN PATENT DOCUMENTS

53-74697 7/1978 Japan .
59-138987 8/1984 Japan .
1202691 8/1989 Japan .

*Primary Examiner*—Donald P. Walsh
*Assistant Examiner*—Frederick H. Voss
*Attorney, Agent, or Firm*—Oblon, Spivak, McClelland, Maier & Neustadt

[57] ABSTRACT

In a field of commercial nuclear reactors, a control blade, which is inserted into and withdrawn from the core of a nuclear reactor so as to start/shut-down the operation thereof and to control the reactor power, must have soundness, high reactivity and long life. The control blade for nuclear reactors is arranged to prevent swelling of a neutron absorber so as to improve the soundness. Furthermore, even if the swelling takes place, the soundness of the control blade can be maintained. The control blade is arranged to prevent the swelling phenomenon in such a manner that boron exhibiting excellent neutron absorbing performance absorbs hydrogen which is produced as a result of reactions with the neutrons. The control blade for nuclear reactors has an upper structure member, a lower structure member, a central tie member disposed between the upper and lower structure members, a plurality of wings connected to each other by the central tie member, and neutron absorber enclosed in the wing. Each of the wings is constituted by a plate member made of hafnium metal, a hafnium alloy or an alloy the main component of which is zirconium or titanium. The neutron absorber comprises a long-lived type neutron absorber which is enclosed in accommodating holes formed in the front insertion portion of the wing which is exposed to a large amount of neutrons and a neutron absorber which is inserted into at least the major portion of the residual accommodating holes and which contains boron. A mixture of a material containing boron and a hydrogen absorber is enclosed in the accommodating holes for accommodating the neutron absorber containing boron disposed in a range from the front insertion portion, which is exposed to a large amount of neutrons, to ¼ of the height L of an effective core portion of a nuclear reactor.

32 Claims, 17 Drawing Sheets

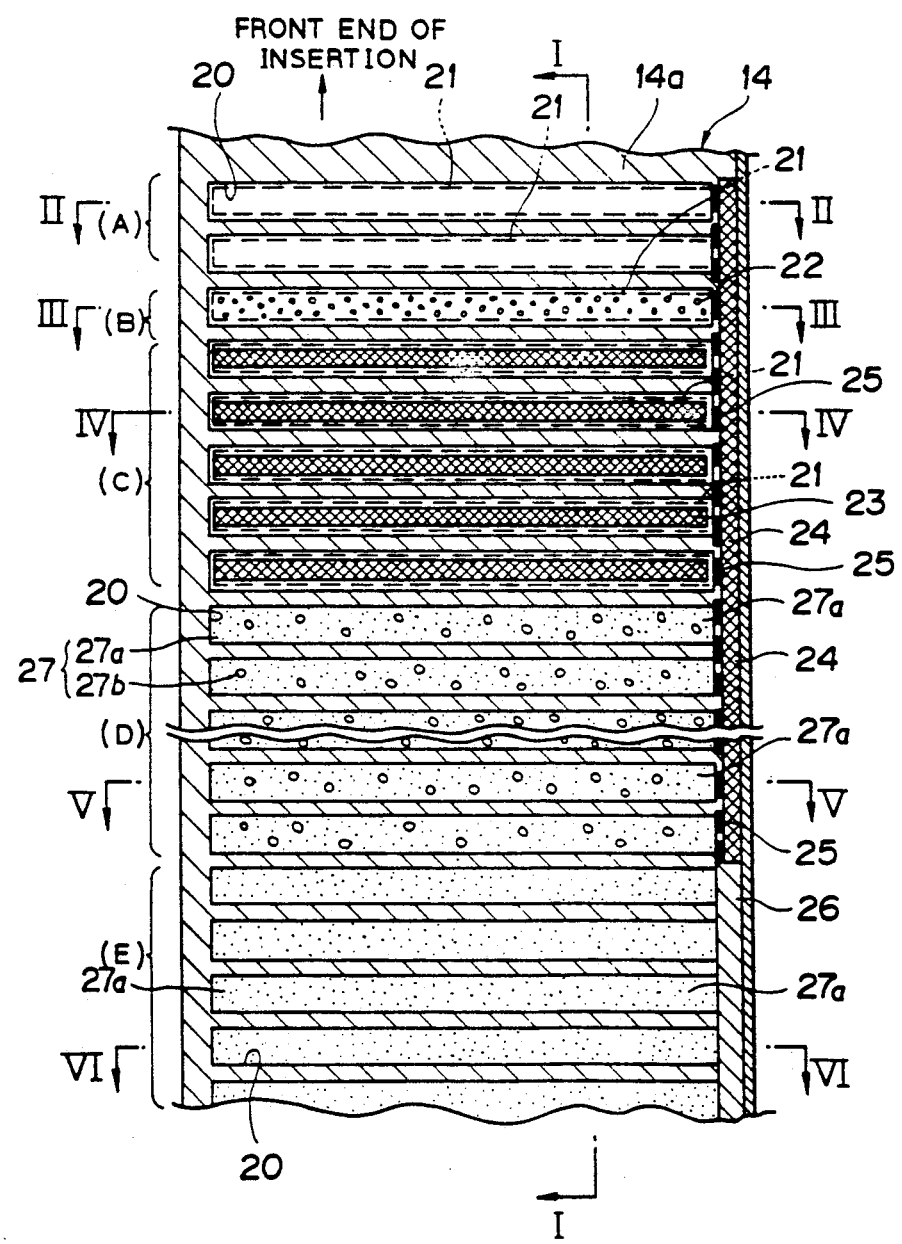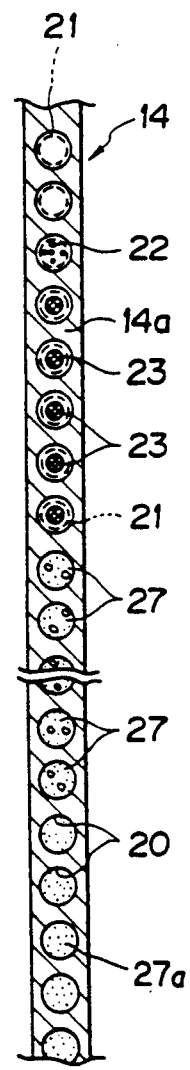

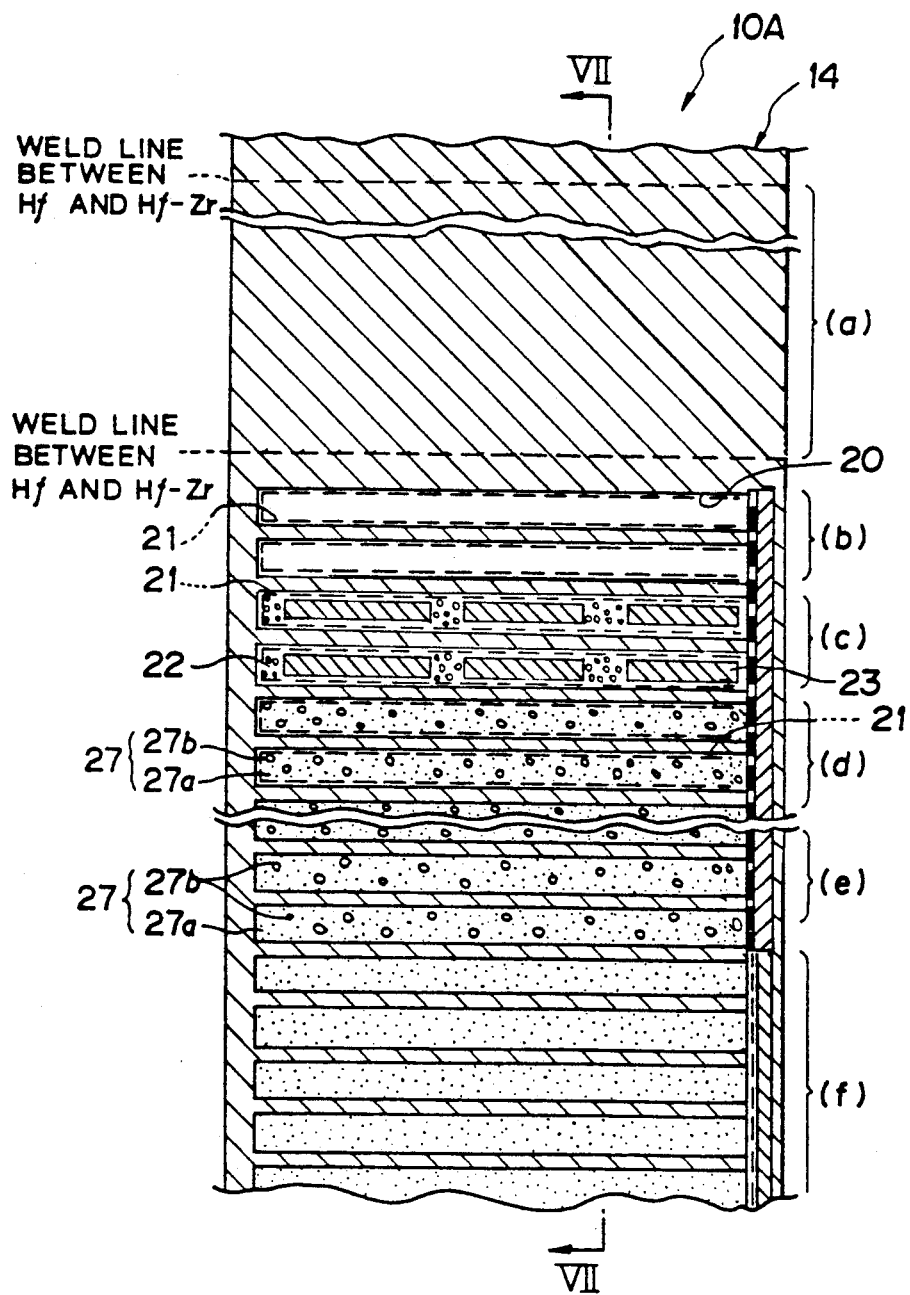

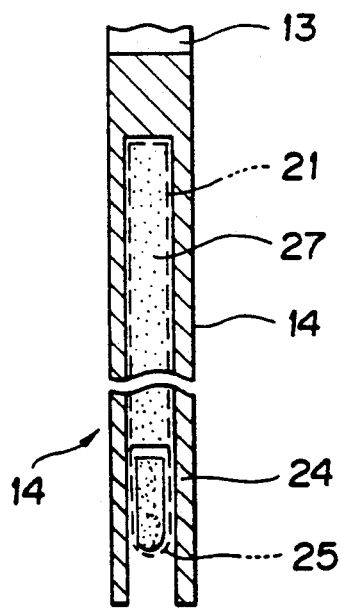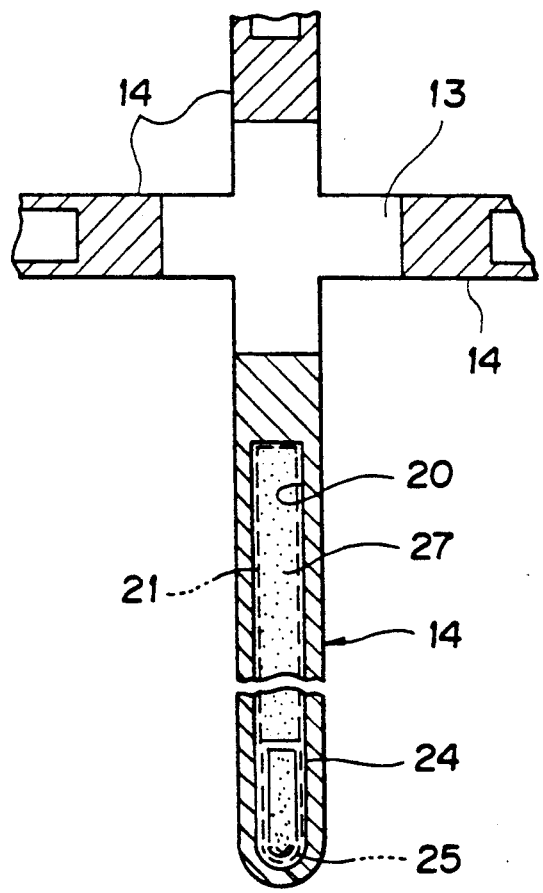

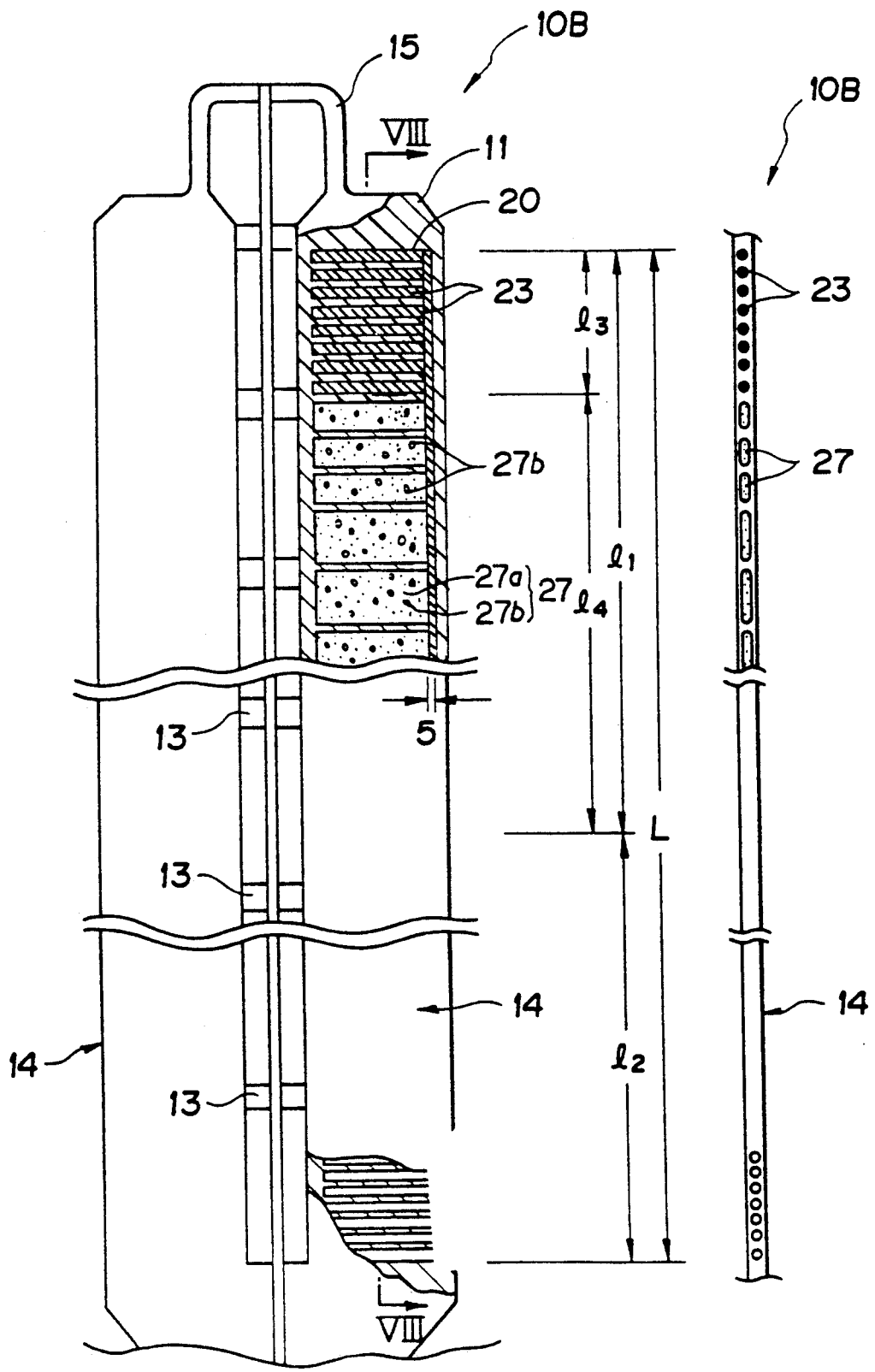

F I G. 18
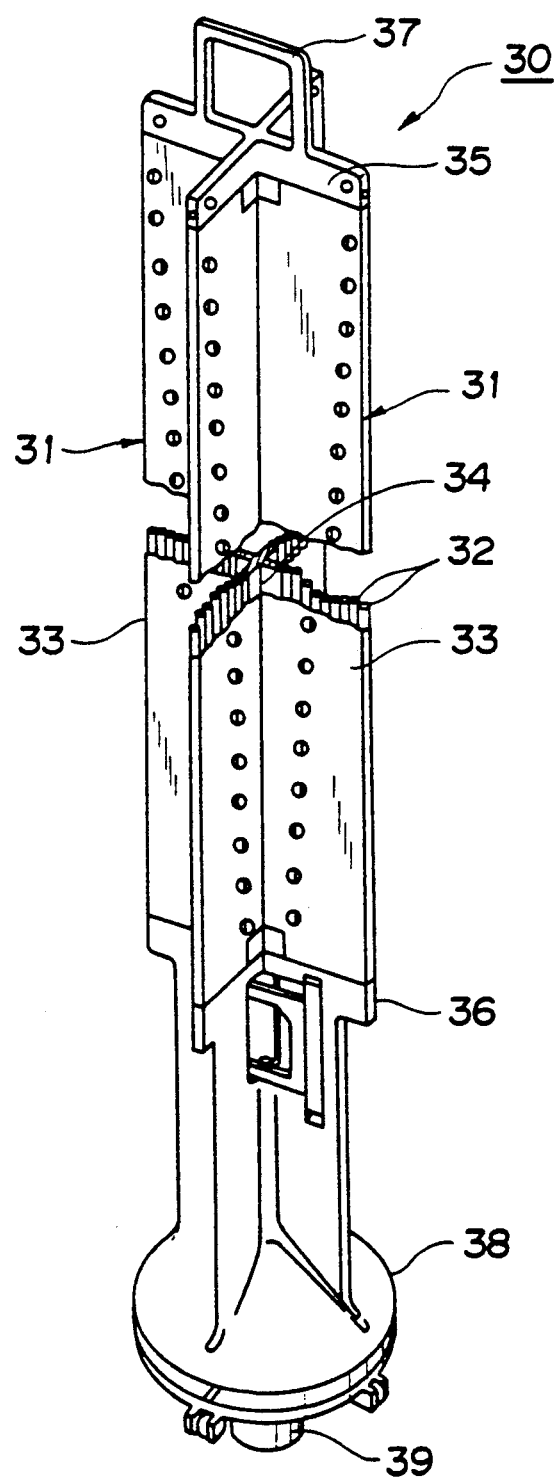

CONTROL BLADE FOR NUCLEAR REACTOR

BACKGROUND OF THE INVENTION

The present invention relates to a control blade for use in nuclear reactors for adjusting and controlling the power of a boiling water reactor or the like, and, more particularly, to an excellent reactivity and long-lived type control blade for nuclear reactors capable of controlling undesirable swelling of a neutron absorber or capable of preventing deterioration in the mechanical and physical life if swelling takes place.

Since the neutron absorption power (capacity) of a control blade for use in boiling water nuclear reactors is gradually deteriorated when it absorbs neutrons, the control blade must be taken out from the core of the nuclear reactor after it has been used for a predetermined period so as to be replaced by a new control blade. However, the above-described replacement work must be performed while shutting down the operation of the nuclear reactor, causing a large scale work to be performed which takes a too long time. Therefore, the time in which the operation of the nuclear reactor must be shut down takes a too long time, causing the availability to be deteriorated. What is even worse, there is a risk for operators to be exposed to radiation.

Furthermore, since the used control blade is a large and strong radioactive waste disposal, there recently arises a desire to lengthen the life of the control blade. As a result, a variety of novel long-lived type control blades for nuclear reactors have been developed, resulting a kind of them to be put into practical use.

The inventor of the present invention has promptly recognized the necessity of realizing a long-lived type control blade and thereby has disclosed a control blade for nuclear reactors for the purpose of lengthening the life thereof in Japanese Patent Laid-Open No. 53-74697 (Japanese Patent Publication No. 59-138987). The control blade for nuclear reactors according to the above-made disclosure is basically arranged in such a manner that a long-lived type neutron absorber exemplified by Hf metal or an Ag-In-Cd alloy is, in place of a boron compound, disposed in a portion which is exposed to a relatively large amount of neutrons.

A control blade for nuclear reactors is detachably inserted from a lower portion of the core into a gap having a cross-shaped lateral cross section and formed between fuel assemblies each of which is a set composed of four fuel assemblies loaded in the core portion of a nuclear reactor. The front portion of insertion and the outer end portion (the outer side end portion of the wing) of the control blade for nuclear reactors are exposed to a particularly large amount of neutrons. Therefore, hafnium (Hf), the neutron absorption power (capacity) of which cannot be largely deteriorated even if it is exposed to a large amount of neutrons, is disposed in the above-described portions so as to lengthen the life of the control blade for nuclear reactors. Furthermore, cheap and light boron carbide ($B_4C$) is disposed in the other portion of the control blade.

A conventional control blade for nuclear reactors is basically arranged as shown in FIGS. 34 to 36 in such a manner that a plurality of tie members 1 each of which has a cross-shaped connecting portion are disposed in the axial direction at predetermined intervals. Furthermore, four wings 2 each of which is formed into an elongated rectangular plate are secured to the above-described connecting member 1 in such a manner that the four wings 2 form a cross-shape. Reference numeral 3 represents a handle connected to the front portions of the four wings 2.

Each of the wings 2 has a plurality of accommodating holes $2a$ formed in its widthwise direction, each of the accommodating holes $2a$ being formed in line in the lengthwise direction of the wing 2. In the accommodating hole $2a$ formed in the front insertion portion of the wing 2, a long-lived type neutron absorber $3a$ composed of Hf is disposed. Furthermore, a neutron absorber 4 made of $B_4C$ powder is enclosed in the residual accommodating holes $2a$. In the outer side end portion (periphery) of the wing 2 which corresponds to the outer periphery of the control blade A for nuclear reactors, a space $2b$ is formed in the lengthwise direction of the wing 2 in such a manner that it is communicated with each of the accommodating holes $2a$. In the above-described space $2b$, a long-lived type neutron absorber $3b$ composed of Hf is disposed to close an end portion of each of the accommodating holes $2a$. The neutron absorber $3b$ acts to prevent the $B_4C$ powder drop from the accommodating holes $2a$. A stainless steel member 5 for use at the time of welding work is disposed between the neutron absorber $3b$ and the outer periphery of the wing 2.

When the wing 2 thus-arranged is assembled, the neutron absorbers $3a$ and 4 are inserted (injected) into the accommodating hole $2a$ through an opening portion $2c$ (FIG. 35) formed at a position confronting the outer periphery of the wing 2. Then, the neutron absorber $3b$ and the stainless steel member 5 are placed in the space $2b$ before a pair of plate portions $2d$ confronting each other in the opening portion $2c$ are bent inward so as to be closed by welding.

Since the melting point of the neutron absorber $3b$ made of Hf is 2200° C. which is considerably higher than the melting point 1400° C. of the stainless steel member 5, the neutron absorber $3b$ is not melted at the time of the welding work but is held in the outer periphery of the wing 2 made of stainless steel. Therefore, the undesirable mixture of Hf atoms of the neutron absorber $3b$ with the metal present in the portion to be welded can be prevented. As a result, sound weld portion can be obtained.

It is preferable that range $1_1$ (see FIG. 34) in which the long-lived type neutron absorbers $3a$ are disposed 3 cm or longer and as well as 35 cm or shorter from the front insertion portion of the wing which constitutes the control blade for nuclear reactor. If it is shorter than 3 cm, the $B_4C$ powder which constitutes the neutron absorber 4 is undesirably placed in the region which is exposed to a large amount of neutrons. On the contrary, if it is longer than 35 cm, the reactivity worth will be deteriorated at the time of shutting down the nuclear reactor because Hf displays insufficient neutron absorption effect in comparison to $B_4C$. Furthermore, the expensive Hf is excessively used and its weight is heavy, causing an economical disadvantage to be taken place and the overall weight of the control blade for nuclear reactors to be increased undesirably in comparison to the conventional control blade for nuclear reactors.

It is preferable that the length of range $1_2$ of the neutron absorber $3b$ disposed in the outer periphery of the wing 2 be about 0.5 to, 2 cm. If it is shorter than 0.5 cm, the $B_4C$ powder which constitutes the neutron absorber 4 is undesirably placed in the region which is exposed to a large amount of neutrons. If it exceeds 2 cm, Hf which constitute the neutron absorber 3b is undesirably placed in the region (the region adjacent to the central portion of the wing) in which the value of the neutron flux has been reduced, causing the problem similar to the above-made description to arise.

The inventor of the present invention has, in Japanese Patent Laid-Open No. 1-202691, disclosed a novel control blade for nuclear reactors arranged in such a manner its structure is similar to that shown in FIG. 34 and an Hf diluted alloy which is an alloy of Hf and zirconium (Zr) or an alloy of Hf and titanium (Ti) is used in place of stainless steel.

Hafnium forms an all-solid solution type alloy in association with Zr or Ti at an arbitrary ratio. Although a fact is well known that Hf, Zr and Ti are able to maintain satisfactory soundness in nuclear reactors, another fact is known that they absorbs hydrogen, thereby forms a hydride and will generate swelling, which is the cubical expansion, in a state where the quantity of hydrogen is excessively large but oxygen is insufficient. Hf is an excellent neutron absorber possessing multiple types of isotopes and it is known as a typical long-lived type neutron absorber because it is able to prevent the deterioration in the neutron absorbing performance even if it is exposed to neutrons. Furthermore, Hf has a characteristic of particularly absorbing resonance neutrons and its neutron absorption power (capacity) is not rapidly deteriorated even if it is diluted by a diluent to a certain degree.

As described above, although Hf possesses the excellent nuclear neutron-absorbing characteristic, it suffers from an excessively large density (about 13.1 g/cm$^3$). Therefore, there arises a problem in that it cannot be easily employed as a material for the control blade for the conventional nuclear reactors.

On the other hand, Zr has a small density (6.5 g/cm$^3$) and it is able to form an excellent alloy in association with Hf as described above. Also Ti has a small density (4.5 g/cm$^3$) and it is able to form an excellent alloy with Hf. Therefore, an alloy of Hf and Zr or an alloy of Hf and Ti (since Zr or Ti serves as a diluent in view from Hf, they are called diluted alloy in this specification) is able to maintain excellent characteristics in nuclear reactors. Furthermore, the neutron absorption power is not deteriorated in comparison to the structure in which Hf is employed. Furthermore, the density of the diluted alloy can be reduced so that the density of the level possessed by stainless steel (about 8 g/cm$^3$) can easily be realized. Therefore, a control blade for nuclear reactors which can be adapted to conventional nuclear reactors and which is constituted similarly to that shown in FIG. 34 can be constituted.

In this case, the stainless steel member for welding and represented by reference numeral 5 can be omitted from the structure shown in FIGS. 34 to 36. Therefore, it might be feasible to employ a member made of the above-described diluted alloy as the member for performing the welding work.

However, as described above, Hf or the Hf alloy will absorb hydrogen and generate swelling when an excessively large quantity of hydrogen is present and the quantity of oxygen is insufficient. The above-described novel control blade for nuclear reactors (see Japanese Patent Laid-Open No. 1-202691) is arranged in such a manner that accommodating holes are formed in the Hf diluted alloy sheet and the B$_4$C (boron carbide) powder is enclosed in the accommodating holes. $^{10}$B of B$_4$C reacts with neutrons to generate $^4$He and $^7$Li and as well as $^3$T (tritium).

If the amount of neutrons exposed to the control blade increases, the amount of $^3$T produced cannot be neglected. Although the major portion of $^3$T is left in B$_4$C, a portion of it is removed from B$_4$C. Since tritium is hydrogen, it can be absorbed by Hf, Zr or Ti. Therefore, there arises a problem in that the soundness of Hf, the Hf-Zr alloy or the Hf-Ti alloy which also serves as the structure member of the Control blade will be deteriorated.

The control blade for nuclear reactors of the type described above is arranged in such a manner that a multiplicity of the accommodating holes are formed in a sheet made of a diluted alloy prepared by diluting Hf by Zr or Ti serving as a diluent and the boron compound is enclosed in a portion or the major portion of the accommodating holes. There is a fear that tritium ($^3$T) produced when boron reacts with neutrons and hydrogen produced due to a radiolysis of water introduced at the manufacturing process move between accommodating holes and thereby hydrides HfH$_2$ (Hf$^3$T$_2$), ZrH$_2$ (Zr$^3$T$_2$), TiH$_2$ (Ti$^3$T$_2$) or the like is produced with Hf, Zr or Ti. It leads to cubical expansion (swelling) due to the increase in the volume from the original Hf alloy. Therefore, there is a possibility that the stress will be generated in the Hf-Zr alloy or the Hf-Ti alloy from the inner surface of the accommodating hole, the Hf-Zr alloy or Hf-Ti alloy serving as the structure material.

Another long-lived type control blade has been disclosed by the inventor of the present invention in Japanese Patent Publication No. 1-45598 (Japanese Patent Laid-Open No. 57-171291). The control blade for nuclear reactors according to the above-made disclosure employs a neutron absorbing rod. The neutron absorbing rod is arranged in such a manner that boron carbide (B$_4$C) powder and a Hf metal rod or an Ag-In-Cd alloy rod are enclosed in an elongated covered pipe made of stainless steel. Furthermore, metal wool is disposed between the above-described two elements. In the front end portion which is exposed to a large amount of neutrons when viewed in the direction into which the control blade is inserted, the Hf metal rod or the Ag-In-Cd alloy rod is placed, while the B$_4$C powder is enclosed in the end portion opposing the front insertion portion because the amount of the neutron exposure is relatively small in this portion.

However, a fact has been found from the ensuing research that there is a room for improvement in the neutron absorbing rod, which is arranged in such a manner that both the boron compound and the Hf metal or the Ag-In-Cd alloy rod are enclosed. That is, a portion of tritium ($^3$T) produced as a result of boron-neutron reaction in the boron compound is absorbed into the surface layer of the Hf metal or the Ag-In-Cd alloy, which is sealed together, causing swelling to be generated in the neutron absorber. Therefore, the soundness of the covered pipe can be deteriorated.

Furthermore, a portion of water left in the covered tube at the time of the manufacturing process is changed into hydrogen due to radiolysis. Furthermore, since hydrogen is able to transmit the stainless pipe, hydrogen generated due to the radiolysis of the reactor core water can be introduced into the covered pipe. The above-described introduction of hydrogen will cause swelling since it can be absorbed into the surface layer of the Hf metal or the Ag-In-Cd alloy similarly to the above-described case about tritium.

SUMMARY OF THE INVENTION

A major object of the present invention is to provide a large reactivity and long-lived type control blade for nuclear reactors capable of effectively preventing generation of a swelling phenomenon in a long-lived type neutron absorber thereof to improve soundness and thereby lengthening the life while maintaining the mechanical life.

Another object of the present invention is to provide a long-lived type control blade for nuclear reactors capable of, even if hydrogen or tritium, which easily reacts with Hf, Zr or Ti, is present in accommodating holes or the like formed in the wing, restricting production of hydride or preventing generation of stress in accommodating holes if hydride is produced, capable of improving soundness and lengthening the life.

Another object of the present invention is to provide a neutron absorbing rod for use in the long-lived type control blade for nuclear reactors.

Another object of the present invention is to provide a neutron absorbing rod capable of preventing generation of a swelling phenomenon in a neutron absorber, reducing stress generated in a covered pipe due to the swelling if takes place and maintaining soundness.

In order to achieve the above-described objects, a control blade for use in nuclear reactors according to the present invention comprises:

an upper structure means;
a lower structure means;
a central tie means disposed between the upper structure means and the-lower structure means;
a wing means having a plurality of wings connected to each other by the central tie means in such a manner that a plurality of the wings are disposed to form a cross-shape lateral cross section; and
neutron absorber means enclosed in at least a major portion of a multiplicity of accommodating holes formed in a widthwise direction of each wing and in line disposed in a lengthwise direction of the wing, wherein
the wing means is arranged in such a manner that each of the wings is constituted by a plate member made of hafnium metal, a hafnium alloy composed of hafnium and zirconium or titanium, or an alloy the main component of which is zirconium or titanium,
the neutron absorber means comprises a long-lived type neutron absorber which is enclosed in the accommodating holes formed in the front insertion portion of the wing which is exposed to a large amount of neutrons and made of hafnium, metal the main component of which is hafnium, a silver-indium-cadmium Ag-In-Cd alloy and a neutron absorber which is inserted into at least the major portion of the residual accommodating holes and which contains boron, and
a mixture of a material containing boron and at least one hydrogen absorber composed of at least either zirconium particles or hafnium powder is enclosed in the accommodating holes among the accommodating holes for accommodating the neutron absorber containing boron disposed in a range from a front insertion portion, which is exposed to a large amount of neutrons, to $\frac{1}{4} \cdot L$ of the height L of an effective heating portion of a reactor core.

In order to achieve the above-described objects, a control blade for use in nuclear reactors according to the present invention comprises:

an upper structure means;
a lower structure means;
a central tie means for establishing a connection between the upper structure means and the lower structure means;
a sheath plate means connected to the central tie means and having a U-shaped lateral cross section to constitute wings disposed to form a cross-shaped lateral cross section; and
a neutron absorber rod means accommodated in the sheath plate means in line, wherein the neutron absorber rod means is constituted by inserting the long-lived type neutron absorber made of hafnium metal, metal the main component of which is hafnium or a silver-indium-cadmium (Ag-In-Cd) alloy or the like into a covered pipe while forming a gap or sleeve around the neutron absorber or while forming an oxide film on the surface of the neutron absorber.

In order to achieve the above-described objects, a neutron absorbing rod according to the present invention comprises:

an tubular covering(cladding) pipe;
a plug means for sealing two end portions of the covering pipe; and
a neutron absorber means accommodated in the covering pipe, wherein
said neutron absorber means comprises a long-lived type neutron absorber enclosed in one side of the covering pipe, which is exposed to a large amount of neutrons, and made of hafnium metal, alloy the main component of which is hafnium or a silver-indium-cadmium alloy and a neutron absorber enclosed in the residual region and composed of a boron compound, and
the long-lived type neutron absorber is enclosed in the covering pipe while forming a gap or a sleeve around the long-lived type neutron absorber or while forming an oxide film on the surface of the long-lived type neutron absorber.

According to the present invention constituted as described above, a boron compound such as boron carbide ($B_4C$) and europium hexaboride ($EuB_6$) and a hydrogen absorber composed of at least either pure zirconium (Zr) particle exhibiting an excellent hydrogen absorbing efficiency or hafnium (Hf) powder (since Hf displays lower activity than that of Zr, it is preferable that the particle size of it be small). Therefore, tritium ($^3T$) atoms which are produced as a direct or indirect reaction between boron with neutrons and active hydrogen (H) atoms which are produced as a radiolysis of water introduced when the control blade has been manufactured can be effectively absorbed. Therefore, the hydrogenative reaction at the inner surface of the accommodating hole formed in the wing can be effectively prevented. Furthermore, another hydrogenative reaction of the Hf metal or the Ag-In-Cd alloy to be inserted into a portion of the accommodating holes formed in the wing can also be effectively prevented. Since the volume of the Zr particles and the Hf powder increases their volume due to the hydrogen absorption, the enclosing mixture density of the boron compound and at least either the Zr particles or the Hf powder must be adjusted while previously estimating the volume increase.

Furthermore, a zirconium (Zr) sheet exhibiting satisfactory hydrogen absorbing efficiency and reduced hardness is, in a manner to form a sleeve, placed on the inner surface of the accommodating hole formed in the wing. In addition, the boron compound such as $B_4C$ and EuB$_6$ is enclosed in the sleeve. In this case, a manufacturing process may be employed which is arranged in such a manner that a tubular member made of Zr is used to surround it before they are inserted into the accommodating hole. As a result, a gap having a certain size is necessarily formed between the tubular member made of Zr and the inner surface of the accommodating hole. Therefore, if swelling takes place because the tubular member made of Zr absorbed hydrogen, the above-described gap absorbs the cubic expansion, causing the stress induction start moment in the accommodating hole can be significantly delayed. In a case where no hydrogen or little hydrogen has been absorbed since the density of hydrogen in the tubular member made of Zr is low, the tubular member made of Zr or the above-described gap absorbs the cubic expansion due to the swelling of the boron compound. Therefore, the moment at Wee which the stress acts on the accommodating hole can be significantly delayed.

Furthermore, the Hf metal rod or the Ag-In-Cd alloy rod to be inserted into the accommodating hole formed in the wing is longitudinally divided into pieces. A Zr strip is interposed between the above-described pieces. Therefore, if stress acts on the inner surface of the accommodating hole due to some reason, the strip can be crushed, and the generation of excessively large stress can be prevented. Since Zr exhibits satisfactory hydrogen absorbing performance, it absorbs hydrogen if the density of hydrogen has been raised so that the density can be reduced. As a result, swelling generated due to the hydrogen absorption by the insertion member such as the Hf metal rod or the Ag-In-Cd alloy rod to be inserted into the accommodating hole can be significantly prevented. Furthermore, swelling which will take place due to the hydrogen absorption by Hf, the Hf-Zr alloy or the Hf-Ti alloy which forms the accommodating hole can be significantly delayed.

Furthermore, the tubular members made of Zr are inserted into a portion of the accommodating holes formed in the vicinity of front insertion portion. The above-described tubular member is formed into a non-sealed type and a hollow shape to form a gas plenum. If hydrogen or tritium is contained in the gas, it can be absorbed by the Zr tubular member. Therefore, the absorption of hydrogen or tritium into the inner surface of the accommodating hole can be prevented. As a result, the soundness of the accommodating hole can be maintained. That is, it possesses a function as a hydrogen getter and a function as a gas plenum.

The Hf or the Hf alloy or the Ag-In-Cd alloy constituting the long-lived type neutron absorber to be enclosed in the neutron absorbing rod for use in the control blade for nuclear reactors will absorb, to the surface thereof, hydrogen generated due to the radiolysis of water left when the neutron absorbing rod was manufactured, hydrogen supplied from the nuclear core water and introduced after it has transmitted the covering pipe and tritium generated and discharged from the reaction taken place between boron and neutrons, in a case where the boron compound is enclosed together. However, according to the present invention, a gap is formed between the long-lived type neutron absorber and the covering pipe, the long-lived type neutron absorber is surrounded by the thin sleeve made of zirconium, hafnium, titanium or stainless steel, or an oxide film is formed on the surface of the long-lived type neutron absorber before it is accommodated in the covering pipe. Therefore, the generation of stress in the covering pipe due to the swelling of the long-lived type neutron absorber can be significantly prevented.

That is, in a case where the gap is formed between the long-lived type neutron absorber and the covering pipe, the influence of the swelling, if taken place, upon the covering pipe can be significantly reduced. In a case where the thin sleeve is formed around the long-lived type neutron absorber and the sleeve is made of Zr, Hf or Ti, the sleeve serves as the hydrogen getter. Therefore, the swelling of the long-lived type neutron absorber due to the hydrogen absorption can be prevented. Although the sleeve member encounters swelling, the influence upon the covering pipe can be reduced because the gap of a certain size, which serves as the space capable of absorbing swelling, is necessarily formed between the inner surface of the tubular pipe and the outer surface of the sleeve and between the inner surface of the sleeve and the surface of the long-lived type neutron absorber. In the case where the sleeve is made of stainless steel, the long-lived type neutron absorber will generate swelling. However, the formed gap serves as the swelling absorbing space, causing the generation of stress in the covering pipe can be significantly reduced. In the case where the oxide film is formed on the surface of the long-lived type neutron absorber, the oxide film serves as a barrier against the hydrogen absorption. Therefore, the generation of swelling in the long-lived type neutron absorber can be prevented.

In the case where both the above-described long-lived type neutron absorber and the boron compound are enclosed in the covering pipe, the Zr particles or the Hf powder serving as the hydrogen getter is mixed with the boron compound powder placed in a region which is exposed to a relatively large amount of neutrons. As a result, tritium generated when the boron compound is exposed to neutrons is caused to be absorbed by the Zr particles or the Hf powder. Therefore, the discharge of tritium can be prevented, causing swelling of the long-lived type neutron absorber to be prevented. Although the boron compound generates swelling due to He gas generated due to the reaction of the boron compound with neutrons, the generation of stress acting on the covering pipe can be prevented by adjusting the density of enclosing the boron compound.

Another method can be employed in which the boron compound present in a region which is exposed to a relatively large amount of neutrons is enclosed in the inner pipe made of Zr, Hf or stainless steel. In a case where the inner pipe is made of Zr, it is able to serve as the hydrogen getter or a stress relaxer. In the case where it is made of Hf, it possesses a functions as the hydrogen getter and the stress relaxer and as well as a function as the long-lived type neutron absorber. The inner pipe made of stainless steel serves as the stress relaxer realized by forming the gap. However, it is preferable in this case that Zr particles or Hf powder be mixed with the boron compound. Also in this case, the diffusion of tritium discharged from the boron compound into the long-lived type neutron absorber can be substantially prevented. The swelling of the boron compound generated due to the He gas can be absorbed by the inner pipe so that stress generated in the covered pipe is significantly reduced. Therefore, according to the present invention, the soundness of the covered pipe can significantly be improved.

Other and further objects, features and advantages of the invention will be appear more fully from the following description.

BRIEF DESCRIPTION OF THE DRAWINGS

FIG. 2 is a vertical cross sectional view which illustrates an essential portion of the control blade for nuclear reactors shown in FIG. 1;

FIG. 3 is a vertical cross sectional view taken along line I—I shown in FIG. 2;

FIG. 9 is a vertical cross sectional view which illustrates a second embodiment of the control blade for nuclear reactors according to the present invention, where a portion of a wing is illustrated;

FIG. 10 is a vertical cross sectional view taken along line VII—VII shown in FIG. 9;

FIG. 12 illustrates a state where a neutron absorber is inserted into the accommodating holes formed in the wing;

FIG. 13 illustrates a state where the accommodating holes formed in the wing into which the neutron absorber is inserted is sealed;

FIG. 14 is a partial cross sectional view which illustrates a third embodiment of the control blade for nuclear reactors according to the present invention;

FIG. 15 is a vertical cross sectional view taken along line H—H shown in FIG. 14;

FIG. 18 is an overall perspective view which illustrates a sixth embodiment of the control blade for nuclear reactors according to the present invention;

DESCRIPTION OF THE PREFERRED EMBODIMENTS

Figure 1:
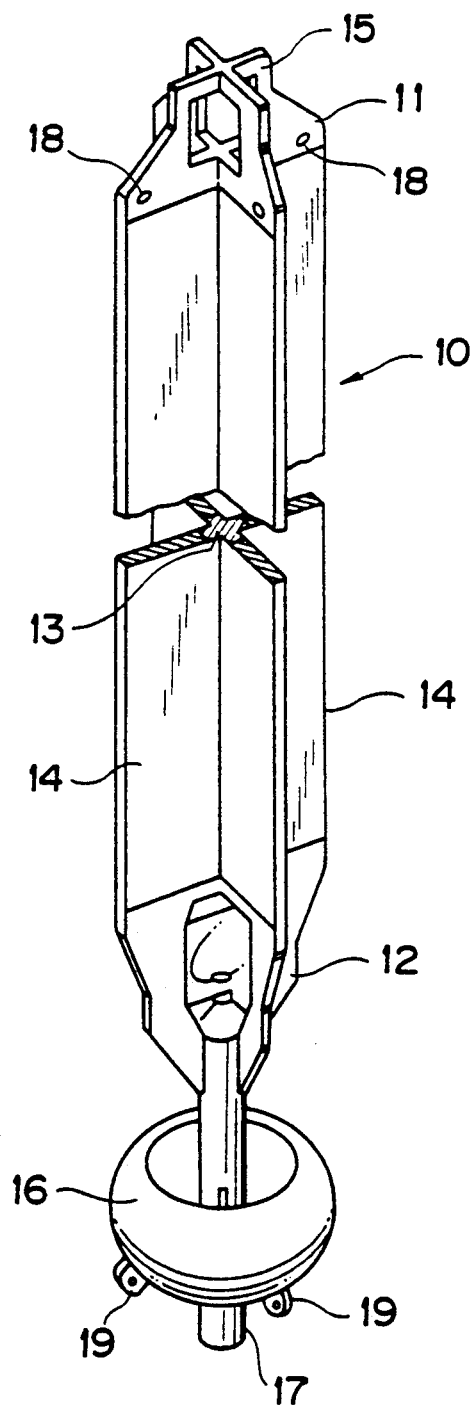
FIG. 1 is an overall perspective view which illustrates a first embodiment of a control blade for nuclear reactors according to the present invention.
Figure 4:
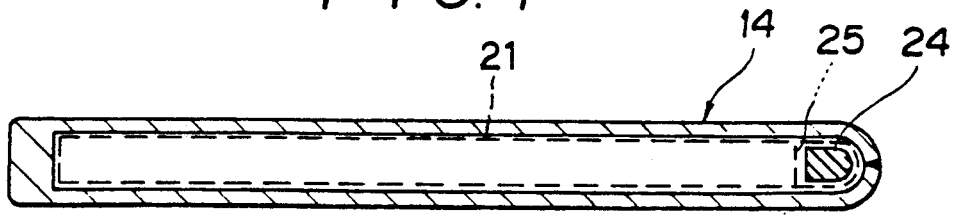
FIG. 4 is a plan cross sectional view taken along line II—II shown in FIG. 2.
Figure 5:
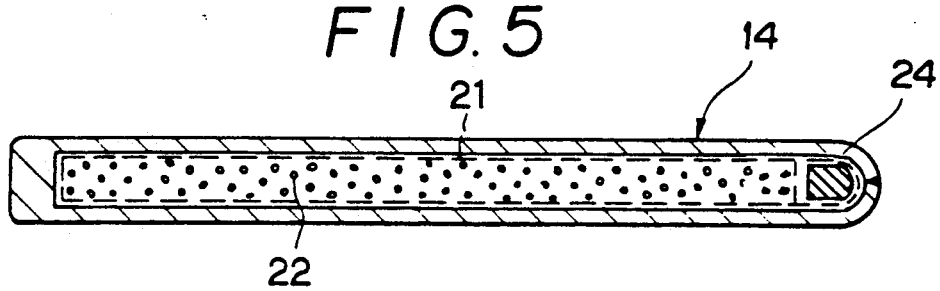
FIG. 5 is a plan cross sectional view taken along line III—III shown in FIG. 2.
Figure 6:
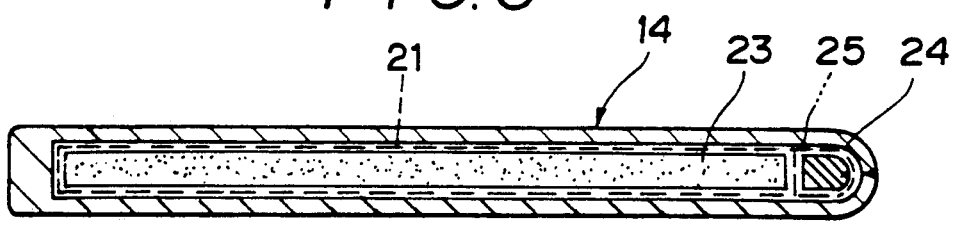
FIG. 6 is a plan cross sectional view taken along line IV—IV shown in FIG. 2.
Figure 7:
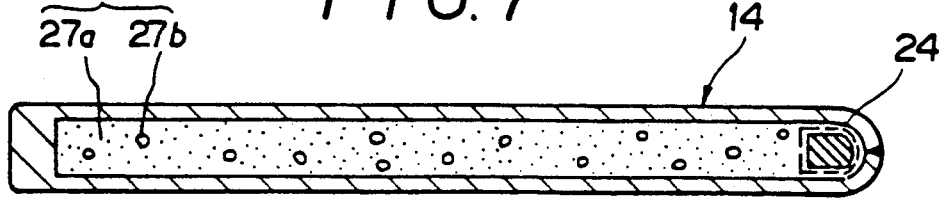
FIG. 7 is a plan cross sectional view taken along line V—V shown in FIG. 2.
Figure 8:
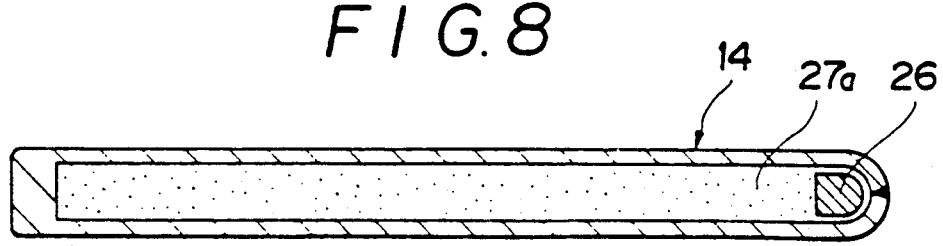
FIG. 8 is a plan cross sectional view taken along line VI—VI shown in FIG. 2.

FIG. 1 illustrates the shape of a first embodiment of a control blade for a nuclear reactor according to the present invention, the overall body of the control blade for a nuclear reactor being represented by reference numeral 10. The control blade 10 for use in a nuclear reactor is arranged to be inserted into or withdrawn form the nuclear reactor core by a control-blade drive mechanism (control rod drive) (omitted from illustration). Each of fuel assemblies is a set composed of four fuel assemblies, the fuel assemblies being disposed in the reactor core portion of a boiling water nuclear reactor serving as a light water reactor. As a result of the insertion/withdrawal of the control blade to and from the reactor core portion, the operation of the nuclear reactor can be shut down and as well as the power of the reactor can be adjusted and controlled.

The control blade 10 for a nuclear reactor comprises an upper structure member 11 serving as an upper structure means, a lower structure member 12 serving as a lower structure means, a central tie member 13 disposed between the upper structure member 11 and the lower structure member 12 and serving as a central tie means and four rectangular wings 14 connected to the central tie member 13 to form a cross-shaped lateral cross section and serving as a wing means. A handle 15 for handling the control blade 10 for a nuclear reactor is integrally provided for the upper structure member 11. On the other hand, a speed limiter 16 is fastened to the lower portion of the lower structure member 12. A coupling socket 17 is disposed below the speed limiter 16, the coupling socket 17 being detachably fastened to the control blade drive mechanism (omitted from the illustration). Reference numerals 18 and 19 respectively represent guide rollers for smoothly guiding the control blade 10 for a nuclear reactor.

The central tie member 13 for connecting the four wings 14 of the control blade 10 may be continuously formed from the upper structure member 11 toward the lower structure member 12. As an alternative to this, a plurality of central tie members 13 are disposed at intervals of 20 to 30 cm. The top end portion 14a of the wing 14 integrally fastened to the central tie member 13 by welding or the like is secured to the upper structure member 11, while the lower portion of the same is secured to the lower structure member 12. Each of the wings 14 is, as shown in FIGS. 2 and 3, formed by a rectangular hafnium metal plate, a metal plate containing hafnium mainly, a plate made of an alloy of hafnium and zirconium (Zr) or an alloy of hafnium and titanium (Ti) or a plate made of an alloy the main component of which is zirconium (Zr) and titanium (Ti). The wing 14 has a multiplicity of accommodating holes 20 disposed in the widthwise direction of the wing 14 for length L which is equivalent to the overall axial length of the core of the nuclear reactor the length L being equivalent to the height of the effective core portion of the nuclear reactor, that is, for example, 3.6 m (144 inches) or 3.7 m (146 inches).

Each of the accommodating holes 20 formed in the wing 14 are sectioned into regions (A) to (E) or more regions when viewed from the front end in the direction of the insertion. Hollow tubular members (sleeves) 21 each of which is made of Zr or pure Zr are inserted into the accommodating holes 20 in the region (A), the Zr or pure Zr hollow tubular members 21 each of which is filled with Zr or pure Zr particles (grain) 22 are inserted into those in the region (B) and Zr or pure Zr tubular members 2, into each of which an Hf metal rod (a hafnium alloy rod or Ag-In-Cd alloy rod) 23 which is a long-lived absorbing material member is inserted, are inserted into those in the region (C). Furthermore, $B_4C$ particles (powder) 27a and Zr or pure Zr particles 27b are, after being mixed, inserted into the accommodating holes 20 in the region (D) and $B_4C$ particles are inserted into the accommodating holes 20 in the region (E).

Since hafnium (Hf) serving as the long-lived type neutron absorber is resonance neutron absorbing material, it is necessary to form into a rod shape having a large surface area with respect to the volume. Hafnium is a metallic element which is extremely chemically stable. A multiple kinds of isotopes Hf-176, Hf-177, Hf-178, Hf-179, Hf-180 and the like exist each of which is able to satisfactorily absorb neutrons and which relatively considerably absorb neutrons of resonance energy. In particular, Hf-177 and Hf-178 exhibit an excellent neutron-absorption effect. For example, Hf-176 absorbs a neutron to change into Hf-177 ,And sequentially absorbs neutrons to change into Hf-180 through Hf-179 via Hf-178. As a result, one Hf atomic nucleus is able to absorb a plurality of neutrons and continues to absorb neutrons for a long time. Therefore, it can be said that hafnium is a long-lived type neutron absorber.

In the above-described regions (A) to (D), a Hf metal rod (or an Ag-In-Cd alloy rod) 24 is disposed in the outer side end portion of the wing 14. Furthermore, a sheet (strip) 25 made of Zr or pure Zr is disposed between the Hf metal rod 24 and the end surface of the above-described accommodating holes 20.

The Hf metal rod (or the Ag-In-Cd alloy rod) 24 is, as shown in FIGS. 4 to 7, surrounded by a sheet 25 made of Zr or pure Zr. In the above-described region (E), an Hf-Zr alloy rod (or an Hf-Ti alloy rod) 26 is disposed in the outer side end portion (peripheral) of the wing 14.

The above-described regions (A) to (D) are exposed to a large amount of neutrons. In particular, the regions (A) to (C) are considerably exposed to the same. Therefore, a boron compound (exemplified by $B_4C$ and $EuB_6$), the life of which is relatively short, is not enclosed, but the Hf metal rod (or Ag-In-Cd alloy rod) 23 exhibiting a long neutron-absorbing life is enclosed in the form of the long-lived type neutron absorber. The region (D) is exposed to a relatively large amount of neutrons and is a region the neutron absorption characteristic of which must be improved. Therefore, the boron compound must be used in the region (D) in such a manner that a mixture 27 formed by mixing the Zr or pure Zr particles 27b, which are hydrogen absorbers, and $B_4C$ 27a is enclosed in order to absorb tritium ($^3T$) which is produced as a result of a reaction between boron and the neutrons and hydrogen (H) which can be produced due to the radiolysis of water.

The above-described region (A) possesses a function as a gas plenum serving as a portion for absorbing ($^3T$) and (H). It is preferable that the axial length of the region (A) be restricted to a length (about 1 to 3 cm) equivalent to the length of one to three accommodating holes 20. A typical example of the designed control blade according to this embodiment is arranged in such a manner that the thickness of the wing 14 is about 8 mm, the diameter of the accommodating hole 20 is about 6 mm and the distance between the central axes of the two accommodating holes 20 is about 8 mm. Therefore, according to this design example, the length for one hole is about 8 mm (to 1 cm) in a lengthwise direction of the wing 14 and that for three holes is 28 mm ($=3\times 8+2\times 2$) to 3 cm.

In the above-described region (B), absorptions of $^3T$ and H are mainly performed. In a case where the Zr or pure Zr particles 22 are enclosed, it is preferable that the length (the number) of the holes in a lengthwise direction of the wing in the portion which is the sum of the regions (A) and (B) be restricted to be shorter than 2 to 3 cm (about 2 to 3 holes) for the purpose of preventing the deterioration in the reactivity worth of the control blade. Assuming that the region (A) includes one hole and the region (B) includes two holes, three holes are disposed in the region (A)+(B), causing the length to be about 3 cm similarly to the above-described structure. In any case, since the regions (A) and (B) are not filled with the neutron absorber, the reactivity worth will be deteriorated if the regions (A) and (B) are arranged to be long.

The region (C) is a portion in which means to prevent swelling of the long-lived type neutron absorber in such a manner that the tubular member 21 made of Zr or pure Zr absorbs $^3T$ ahd H and as well as absorbs the generation of stress due to the swelling of the long-lived type neutron absorber. The Zr or pure Zr serving as the hydrogen absorber is a soft material exhibiting excellent hydrogen absorbing performance. A gap is necessarily formed between the accommodating hole 20 and the tubular member 21 made of Zr or pure Zr, the gap as well as serving as the swelling absorbing space.

Furthermore, the structure is arranged in such a manner that the Zr particles 27b mixed with $B_4C$ 27a absorb $^3T$ and H in the region (D) so as to prevent the diffusion to the other portions. Since the above-described region (E) is exposed to neutrons by a small amount, the ratio of production of $^3T$ is low and as well as the radiolysis speed is low. Therefore, there is no special means in this region.

The length of the regions (A) to (D) of the control blade of a type which is inserted during the operation is usually arranged to be $\frac{1}{4}$ to $\frac{3}{4}$ of the overall length L of the reactor core and about $\frac{1}{2}\cdot L$ of the same. However, it is varied depending upon how the control blade is used. For example, in a case where it is completely removed during the operation, it might be considered feasible to make the total length of (A) to (D) to be shorter than $\frac{1}{4}\cdot L$ of the same, for example, about 30 cm or shorter.

Then, the reason why the above-described range ($\frac{1}{4}$ to $\frac{3}{4}$ of the overall length L of the reactor core) is employed will now be described. That is, evaluating the actual and average neutron exposure amount distribution in the control blade of a type which is inserted during the operation, the amount of exposure is plane and high in a region of a length of about $\frac{1}{2}$ of the overall length L from the front end portion of the insertion of the control blade 10. The amount of neutron exposure increases in a region of about 15 cm (in a region of about 35 cm or shorter) from the leading end portion of the insertion. In particular, an extremely high amount of the exposure is shown in a region of about 5 cm in the front end portion.

On the other hand, the amount of the neutron exposure is rapidly reduced at a position of about $\frac{1}{2}$·L from the front end portion of the insertion of the control blade 10 toward the end portion of the insertion. The amount of the neutron exposure is considerably reduced in a region of $\frac{1}{4}$·L from the end portion of the insertion toward the front portion of the insertion. The control blade is changed depending upon how it is used and the above-described value $\frac{1}{2}$·L is changed in a range between $\frac{1}{4}$ and $\frac{3}{4}$·L.

In the above-described range from (A) to (D), the sheet (strip) 25 made of Zr or pure Zr and disposed on the outer surface of the accommodating hole 20 and the Zr or pure Zr material placed to surround the outer Hf metal rod (or the Ag-In-Cd alloy rod) 24 act similarly to the tubular member 21 disposed in the above-described region (C) and made of pure Zr. The total length of the region (A) to (C) is arranged to be about 15 to 35 cm. If it is longer than the above-described length, it is not preferable because the weight of the control blade will be increased and the reactivity worth can be deteriorated.

A second embodiment of a control blade 10A for a nuclear reactor according to the present invention will now be described with reference to FIGS. 9 and 10. Referring to FIGS. 9 and 10, the same or equivalent elements to those according to the above-described first embodiment are given the same reference numerals at the time of making the descriptions about them.

Referring to FIG. 9, a range of the front end portion of the insertion designated by symbol (a) is constituted by integrally forming, by welding, metal the main component of which is Hf (for example, Hf metal containing Zr by 2 to 3 wt. %) with an Hf-Zr alloy or an Hf-Ti alloy member accommodating the accommodating holes 20. The length of this range is arranged to be about 3 to 35 cm, usually about 10 to 15 cm. Since this range is exposed to a large amount of neutrons, the Hf material, which is the long-lived absorber, is used as it is (approximating 100%, usually 97%).

A range (b) is constituted similarly to that shown in a cross sectional view taken along line II—II of FIG. 2. It is preferable that the number of the accommodating holes be about two or less.

In a range (c), the tubular member 21 made of Zr or pure Zr is inserted into the accommodating hole 20. Furthermore, the Hf metal rod (or the Ag-In-Cd alloy rod) 23 the diameter of which is reduced and the length of the same is shortened and the Zr or pure Zr particles 22 which are hydrogen absorbers are alternately inserted into it. The tubular member 21 made of Zr or pure Zr forms a small gap in association with the accommodating hole 20, the small gap serving as a space into which swelling can be received. In addition, the tubular member 21 acts to absorb swelling of the Hf metal rod (or the Ag-In-Cd alloy rod) 23, serves as a hydrogen getter for getting $^3T$ and H and forms a space for absorbing the lengthwise swelling of the Hf metal rod (or the Ag-In-Cd alloy rod) 23.

The total length of (b) and (c) is usually arranged to be about 15 cm. It is preferable that the range (c) has about two or three accommodating holes 20 bored therein. However, since the material for the wing forming the accommodating hole 20 contains the neutron absorber of Hf, it can be eliminated. In the region (d), the tubular memer 21 made of Zr or pure Zr is inserted into the accommodating hole 20. Furthermore, a mixture of the boron compound and the hydrogen absorber made of Zr or pure Zr particles are inserted into the above-described tubular member 21 made of Zr or pure Zr. The tubular member 21 made of Zr or pure Zr forms the swelling space from the accommodating hole 20. Furthermore, the tubular body serves as a hydrogen getter for getting $^3T$ and H and forms a region for absorbing (relieving) the swelling of boron. The Zr or pure Zr particles mainly serve as the hydrogen getter for getting $^3T$ and H. A range (e) is constituted similarly to that shown in a cross sectional view taken along line V—V of FIG. 2.

Although the structures shown in FIGS. 2 and 9 are described to show the embodiments, the control blade for a nuclear reactor is in actual constituted in a considerably complicated manner because the above-described embodiments are combined. They can, of course, be simplified to meet a desire. For example, the portions shown in the cross sectional views respectively taken along lines II—II and III—III of FIG. 2 can be replaced by the portion shown in the cross sectional view taken along lines IV—IV. Furthermore, the regions (c) and (d) of FIG. 9 may be replaced by structures to be described later referring to FIGS. 11(B) to 11(E) and 11(G).

Figure 11A:
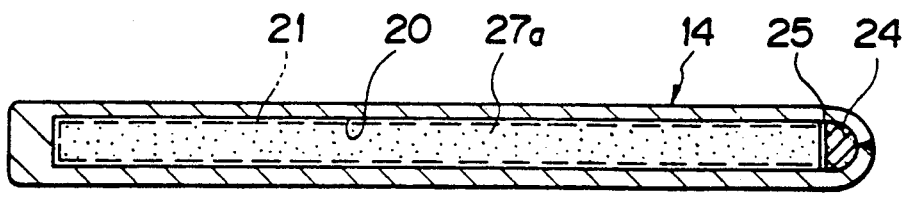
FIGS. 11(A) to 11(I) are respectively plan cross sectional views which illustrate structures of accommodating holes of a wing for the control blade for nuclear reactors according to the present invention.

FIGS. 11(A) to 11(I) respectively illustrate structures of the accommodating hole portions of the control blade for a nuclear reactor according to the present invention. Referring to FIG. 11(A), the neutral absorber made of the boron compound (exemplified by $B_4C$ and $EuB_6$) 27 is enclosed in the tubular member (sleeve) 21 made of Zr or pure Zr. The Hf metal rod (or the Ag-In-Cd alloy rod) 23 is disposed at the outer side end portion of the wing. Furthermore, the sheet (strip) 25 made of Zr is disposed in the portion from the accommodating hole 20.

Figure 11B:
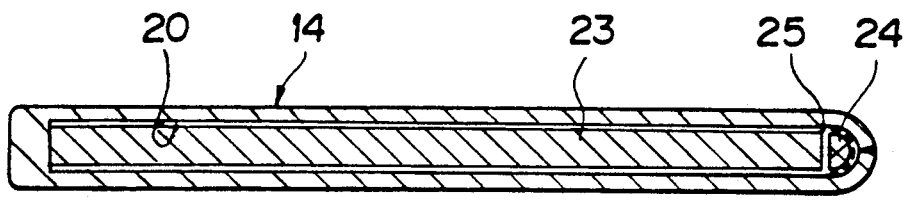
Figure 11C:
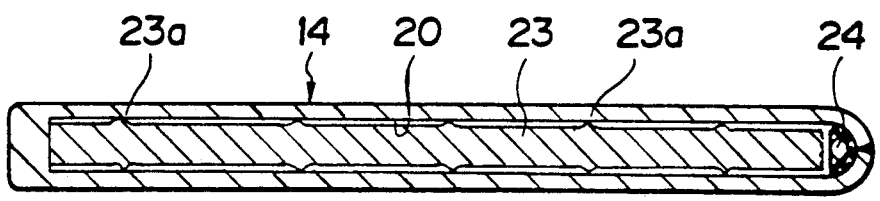
Figure 11D:
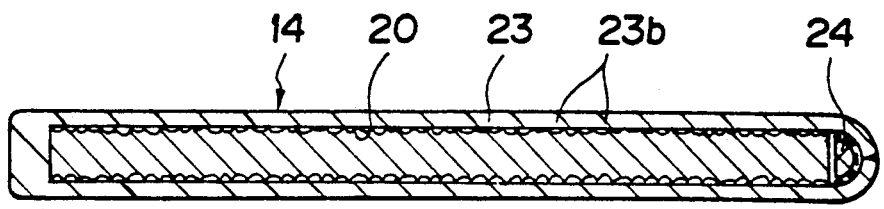

Referring to FIG. 11(B), the diameter of the Hf metal rod (or the Ag-In-Cd alloy rod) 23 to be inserted is reduced for the purpose of maintaining the swelling space. The Hf metal rod 23 disposed at the outer end portion of the wing is surrounded by the tubular member 21 made of Zr or pure Zr and the sheet 25 made of Zr or pure Zr. Referring to FIG. 11(C), the diameter of the Hf metal rod (or the Ag-In-Cd alloy rod) 23 to be inserted is reduced. Furthermore, a multiplicity of projecting portions 23a which can be easily deformed at the time of swelling are formed in the circumferential direction of the Hf metal rod 23. Referring to FIG. 11(D), the Hf metal rod (or the Ag-In-Cd metal rod) 23 to be inserted is constituted by forming projection 23b around a bolt so that portions to be crushed are formed.

Figure 11E:
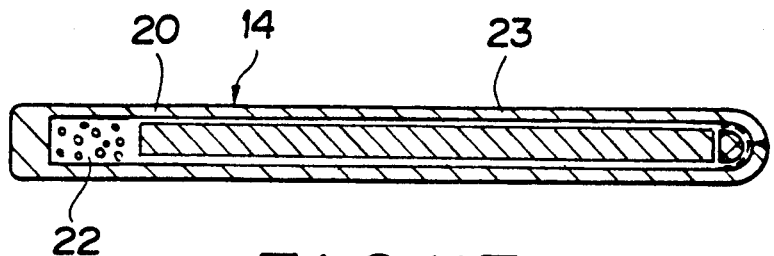
Figure 11F:
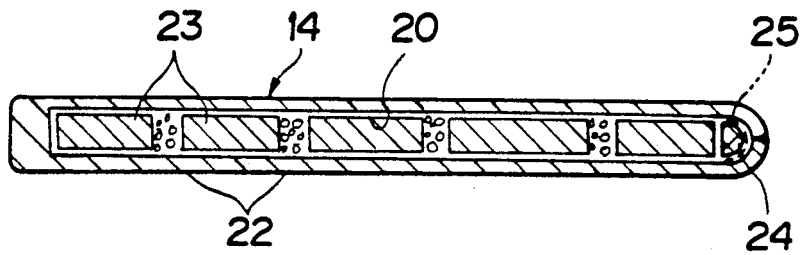

Referring to FIG. 11(E), the length of the Hf metal rod (or the Ag-In-Cd metal rod) 23 to be inserted is made to be shorter than the depth of the accommodating hole 20 so that the pure Zr particles hydrogen absorber 22 are inserted in the space created as a result of shortening the above-described length. Referring to FIG. 11(F), the Hf metal rod (or the Ag-In-Cd metal rod) 23 to be inserted are sectioned into a plurality of short pieces (elements) so that the Zr or pure Zr particles 22 are inserted between the short pieces.

Figure 11G:
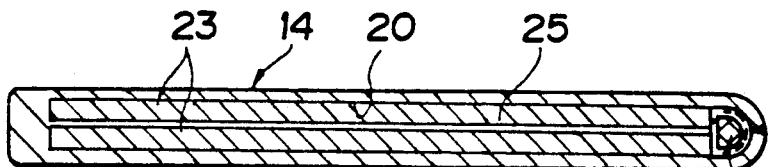

Referring to FIG. 11(G), the Hf metal rod (or the Ag-In-Cd metal rod) 23 to be inserted is vertically divided in the lengthwise direction. The portions between the vertically divided sections have projections which can be crushed by the swelling or the strips made of pure Zr are placed between the vertically divided sections. Therefore, the former structure is employed to relief the swelling, while the latter structure is able to relief the swelling and as well as is able to serve as a hydrogen getter because the low hardness (soft) pure Zr strip 25 is interposed.

Figure 11H:
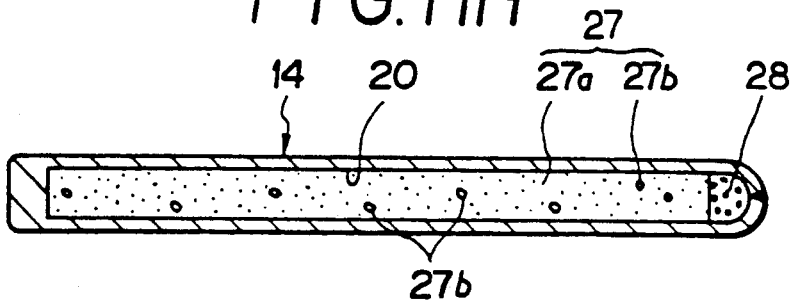
Figure 11I:
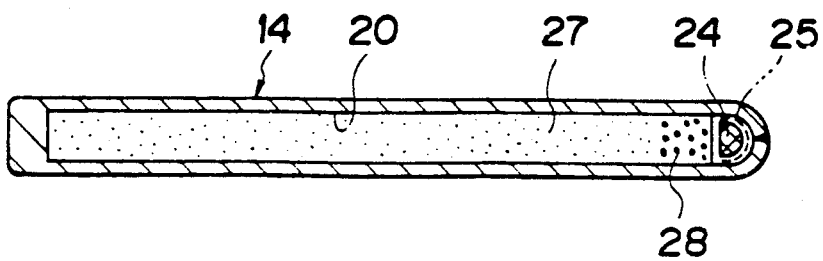

Referring to FIG. 11(H), the boron compound 27, for example, B$_4$C particles 27a mixed with the Zr or pure Zr particles 27b are enclosed in the accommodating hole 20. Furthermore, Hf particles (grain) 28 are enclosed in the outer side end portion of the wing 14. The Hf particles 28 placed in the outer portion of the wing 14 possesses a function as the long-lived t e neutron absorber and as a hydrogen getter. Since Hf displays restricted hydrogen absorbing performance in comparison to that possessed by the Zr or pure Zr, the particle size of it is made to be smaller, that is powder (small particles) in comparison to the Zr or pure Zr particles 22 to enlarge the surface area. Referring to FIG. 11(I), the Hf particles 28 are enclosed in the portion adjacent to the end portion of the accommodating hole 20. Furthermore, the boron compound 27 are enclosed in the accommodating hole 20. In addition, a Zr string is disposed between the end surface of the accommodating hole 20 and the Hf metal rod 24 surrounded by Zr or pure Zr on the outer side end portion of the wing 14. In this case, the Hf particles 28 possesses the function of the hydrogen getter, which is the hydrogen absorber, and the function of the long-lived type neutron absorber.

If an oxide is formed on the surface of the Hf metal rod 23 to be inserted into the accommodating hole 20, the hydrogen absorption of the Hf metal rod 23 can be restricted. Therefore, further swelling can be restricted. The description "further swelling can be restricted" means that additional swelling due to the hydrogen absorption is substantially prevented because the swelling has been taken place in such a manner that the Hf metal rod 23, in which swelling has taken place due to the oxidation, is inserted into the accommodating hole 23 while keeping a certain gap.

In an oxide film is formed on the inner surface of the accommodating hole 20, the oxide film thus-formed will prevent the generation of the swelling from the inner surface of the accommodating hole 20 made of the Hf, Hf-Zr, or Hf-Ti alloy and constituting the wing 14 can be prevented or reduced.

FIGS. 12 and 13 respectively illustrates a state when a selected neutron absorber or a hydrogen getter is enclosed in the accommodating hole 20 so as to hermetically weld there. The hollow tubular member 21 made of Zr or pure Zr is inserted into the accommodating hole 20, the hollow tubular member 21 being filled with the neutron absorber 27 composed of the B$_4$C powder. Furthermore, the Hf metal rod 24 surrounded by the sheet 25 made of Zr or pure Zr is placed in the vicinity of the outer side end portion of the wing. Since the Hf alloy member forming the wing 14, that is, the Hf-Zr member (or the Hf-Ti member), is formed into a shape having an end opening, this portion is turned inside so as to close the outer portion by welding as shown in FIG. 13. Since the Hf alloy which constitutes the wing and the Zr or pure Zr are changed to an alloy in association with each other, a portion of the sheet 25 made of the Zr or pure Zr which surrounds the Hf at the time of the hermetical welding is melted and is moved to the welded portion. However, no problem arises because the above-described alloy is an extremely safety alloy.

Figure 35:
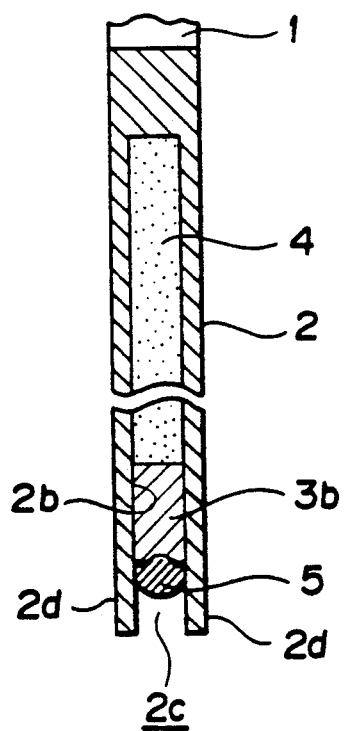
FIG. 35 illustrates a state where a neutron absorber enclosed in the accommodating hole formed in the wing for a conventional control blade for nuclear reactors is inserted.
Figure 36:
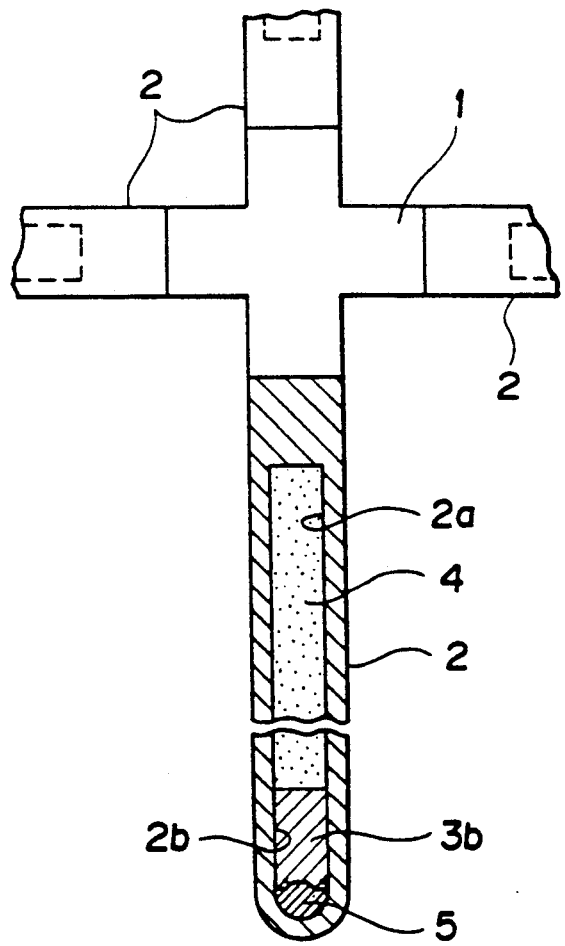
FIG. 36 illustrates a state where the neutron absorber inserted as shown in FIG. 35 is sealed.

At the time of welding, an Hf alloy member composed substantially similarly to the wing structural view may be placed on the reverse (inner) side of the welding portion similarly to the conventional structure shown in FIGS. 35 and 36.

FIGS. 14 and 15 illustrates a third embodiment of the control blade for a nuclear reactor according to the present invention. The same or equivalent elements to those according to the above-described first embodiment are given the same reference numerals.

Although this embodiment is basically arranged in the same manner as the above-described first and second embodiments, the Hf metal rod 23 in which a portion of the above-described embodiments is employed is inserted into the front portion $1_3$ of the insertion of the control blade. In a region of length $1_4$ (about ¼ to ½ of the overall length L of the effective portion) from the above-described front portion toward the end portion of the insertion of the control blade, the accommodating hole 20 is formed into an elongated hole so that a larger quantity of the neutron absorber composed of the boron compound 27a such as B$_4$C is inserted. Furthermore, the pure Zr particle 27b are mixed so as to serve as hydrogen getter (the hydrogen absorber). In this case, the reactivity worth can be improved since a larger quantity of boron is enclosed. Since the ratio of $^3$T generation is low in the portion $1_2$ and as well as there is no necessity of particularly improving the reactivity worth, usual circular holes are simply arranged in which the neutron absorber such as B$_4$C is enclosed.

Figure 16:
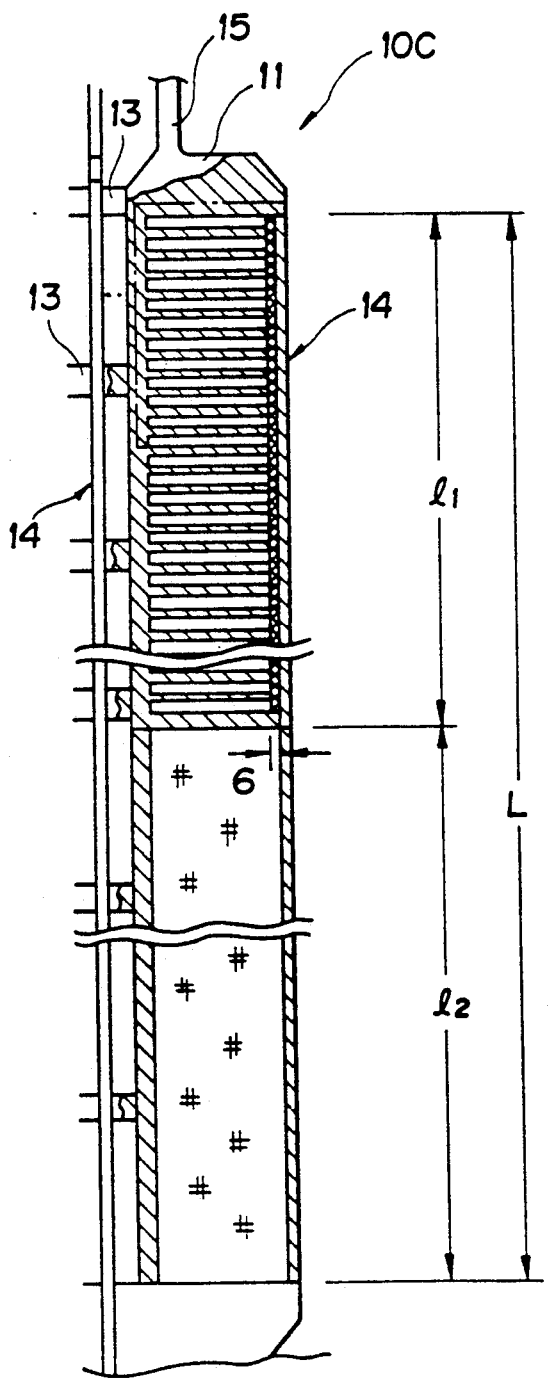
FIG. 16 is a cross sectional view which illustrates a fourth embodiment of the control blade for nuclear reactors according to the present invention.

FIG. 16 illustrates a fourth embodiment of a control blade 10C for a nuclear reactor according to the present invention, where the same or equivalent elements to those according to the above-described first embodiment are given the same reference numerals.

The control blade according to this embodiment is arranged in such a manner that the front portion $1_1$ (about ¼ to ½·L) of the insertion thereof is structured such that the accommodating hole is formed in the Hf-Zr or Hf-Ti alloy plate and the end portion $1_2$ of the insertion is structured such that two Hf plates are disposed to confront each other while holding a gap therebetween. Water is enclosed in the portion between the two Hf plates so as to serve as the neutron moderator and to perform the cooling operation. The prevention of the absorption of $^3$T and H from the inside of the accommodating hole and the like are arranged similarly to the above-described first to third embodiments.

Figure 17:
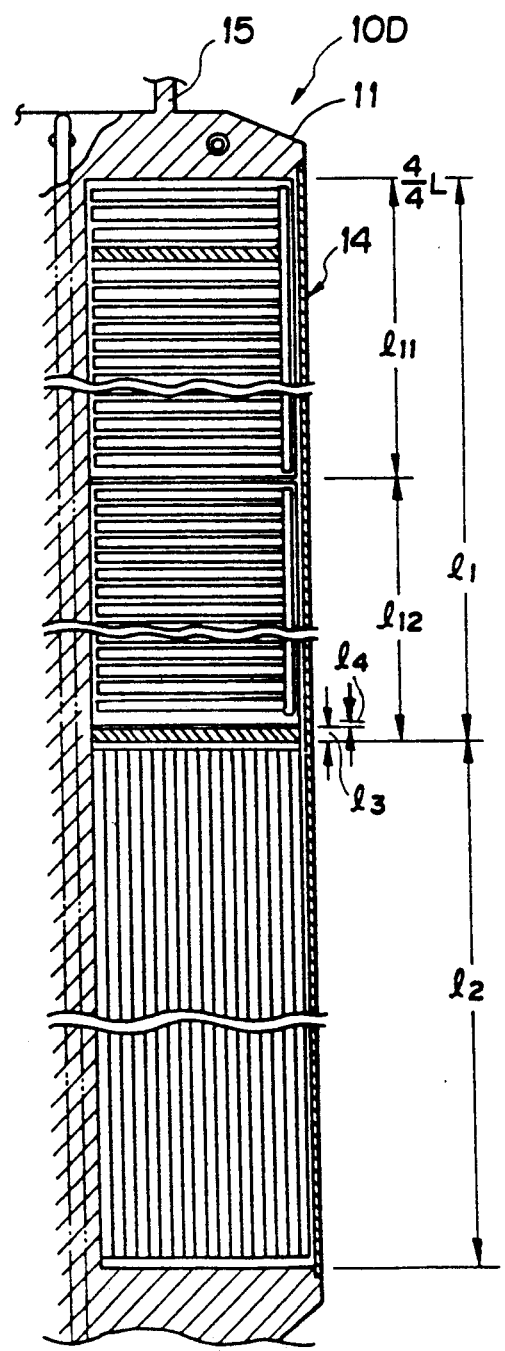
FIG. 17 illustrates a fifth embodiment of the control blade for nuclear reactors according to the present invention.

FIG. 17 illustrates a fifth embodiment of a control blade 10D for a nuclear reactor according to the present invention, where the same or equivalent elements to those according to the above-described first embodiment are given the same reference numerals.

The control blade 10(D) according to this embodiment is arranged in such a manner that the wing 2 is constituted by placing the neutron absorber in a U-shaped sheath. In the region $1_1$ (about ¼ to ½·L) of the front portion of the insertion of the control blade, the accommodating hole is formed in the Hf metal plate, Hf-Zr or Hf-Ti alloy of an ordinary composition containing 2 to 3 wt. % Zr. Furthermore, the neutron absorber is enclosed. The end portion $1_2$ of the insertion is arranged in such a manner that conventional neutron absorbing rods structured such that the $B_4C$ powder is enclosed in a stainless steel pipe are arranged. If the U-shape sheath is made of the Hf-Zr or Hf-Ti alloy, the reactivity can be improved and the life can be lengthened. The sheath member may be made of stainless steel in a case where the above-described requirements are not made. The neutron absorbing element to be inserted into the portion $1_1$ is sectioned into a portion $1_{11}$ and a portion $1_{12}$. If the density of Hf is made to be high in the portion $1_{11}$, it is effective to improve the reactivity and to lengthen the life. However, since the weight of the control blade is undesirably increased, the density of Hf is lowered in the portion $1_{12}$ so as to reduce the weight and the overall cost.

The portion $1_3$ acts to restrict a local peaking of the neutron flux due to the reduction in the quantity of the neutron absorber in the boundary portion. Accordingly, the Hf metal is placed.

Since the control blade for a nuclear reactor according to this embodiment is arranged in such a manner that a mixture of a material containing boron and at least either the Zr or pure Zr particles or hafnium particles is enclosed in the accommodating hole, hydrogen and tritium can be absorbed and the hydrogen absorption on the inner surface of the accommodating hole can be prevented.

Furthermore, since the boron compound surrounded by the zirconium or pure zirconium sheet is enclosed in the accommodating hole formed in the wing, swelling taken place due to the neutron reaction of the boron compound can be absorbed and as well as hydrogen and tritium can be absorbed. As a result, generation of stress in the accommodating hole and hydrogen absorption can be prevented.

In addition, since hafnium metal member or Ag-In-Cd alloy member is longitudinally sectioned so as to hold the Zr or pure Zr strip between two confront sides, the zirconium strip acts to a relief portion for stress which acts on the accommodating hole due to swelling because the pure zirconium strip has low hardness. Furthermore, since it exhibits excellent hydrogen absorbing performance, it is able to absorb hydrogen if hydrogen exists prior to other materials. As a result, the hydrogen absorption into the inner surface of the accommodating hole, the Hf metal and Ag-In-Cd alloy can be prevented and as well as swelling taken place caused from the hydrogen absorption can be prevented. Therefore, the generation of stress acting on the accommodating hole can be prevented.

Furthermore, the control blade for a nuclear reactor according to this embodiment is arranged in such a manner that a tubular member made of zirconium or pure zirconium exhibiting satisfactory hydrogen absorbing performance is inserted into at least a portion of the accommodating holes disposed in a region of at least 3 cm and as well as 35 cm or shorter from the front portion of the insertion. Furthermore, the portion inside and outside of the tubular member is formed into a non-hermeical shape so as to serve as a gas plenum. As a result, the hydrogen absorption of the hafnium and Ag-In-Cd alloy to be inserted can be prevented. In addition, the generation of stress due to the swelling can be prevented and to restrict the gas pressure rise in the control blade. Consequently, the soundness of the control blade can be satisfactorily maintained.

Then, a sixth embodiment of a control blade for a nuclear reactor will now be described.

A control blade 30 for a nuclear reactor is a conventional typed control blade as shown in FIG. 18, the control blade 30 having four wings 31 which accommodating an improved neutron absorbing rod 32.

Each of the wings 31 comprises sheath plate 33 having a deep U-shape cross section and serving as a sheath plate means in such a manner that the opening sides of the sheath plate 33 is secured to a central tie rod 34 serving as a central tie means in such a manner that the opening sides of the wings 31 are disposed to form a cross-shape lateral cross section. A multiplicity of neutron absorbing rods 32 are disposed in line in the sheath plate 33, the neutron absorbing rod 32 serving as a neutron absorber rod means. Reference numeral 35 represents an upper structure member, 36 represents a lower structure member, 37 represents a handle, 38 represents a speed limiter and 39 represents a coupling socket.

Figure 19:
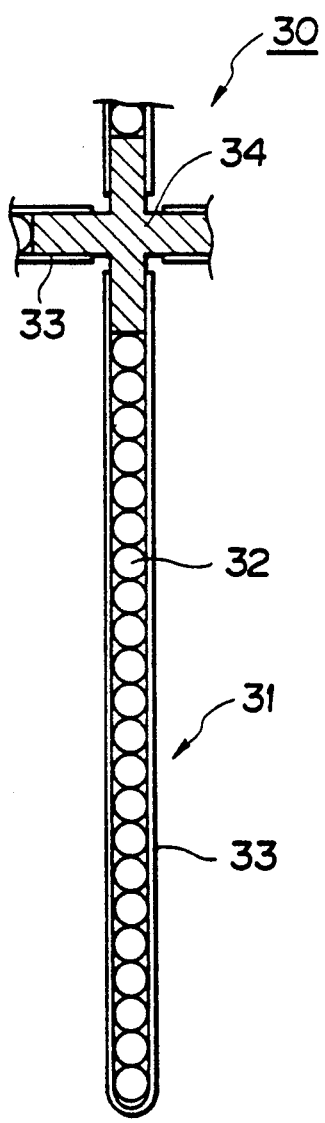
FIG. 19 is a cross sectional view which illustrates a portion shown in FIG. 18.

As shown in FIG. 19, the neutron absorbing rod 32 has an elongated cladding or covering pipe 40 serving as a poison tube, the covering pipe 40 accommodating neutron absorbing members and material 41 and 42. The two end portions of the covering pipe 40 are closed by plugs 43 serving as plug means. Although the covering pipe 40 is usually made of stainless steel, it may be made of Hf metal, an Hf alloy the main component of which is Hf and Zr or another Hf alloy the main component of which is Hf and Ti.

The neutron absorbing rod 32 is mainly sectioned into three portions X, Y and Z. The portion X is a portion exposed to neutron by a large amount when it is accommodated in the control blade 30. Therefore, a long-lived type neutron absorbing member 41 made of Hf metal, an Hf alloy composed of Hf and Zr or Ti, or an Ag-In-Cd alloy is disposed in the portion X. According to this embodiment, the diameter of the long-lived type neutron absorbing member 41 is arranged to be smaller, by a certain quantity, than the inner diameter of the covering pipe 40 as unsealed type inner pipe. Furthermore, a thin sleeve 44 made of pure Zr, Hf, Ti or stainless steel is formed around the long-lived neutron absorbing member 41 is inserted into the covering pipe 40. In the portions Y and Z, the boron compound 42 formed into powder and serving as the neutron absorbing member is disposed. Since the portion Y is exposed to neutron by a relatively large amount, pure Zr particles and/or Hf powder 45 serving as the hydrogen getter (the hydrogen absorber) is mixed with the boron compound 42. Since the portion Z is exposed to neutron by a reduced quantity and thereby the ratio of generation of tritium ($^3T$) is low, the hydrogen getter is omitted from the structure.

Although the boron compound 42 is exemplified by $B_4C$, $EuB_6$ or BN may be employed. Since the boron compound 42 encounters swelling because He gas is produced as a result of a reaction with neutron, the charging density of the boron compound 42 must be determined after the quantity of swelling which can be generated due to the neutron irradiation has been estimated. Although the length of the portion X can be made to be $\frac{3}{4}$ of the overall length L if necessary, it can be set to about 3 to 5 cm if a short length is required. The length must be determined depending upon how to use the control blade 30 which accommodates the neutron absorbing rod 32. In a case where the control blade 30 is considerably inserted into the nuclear core during the operation of the nuclear reactor, it is arranged to be about ½ of the overall length L. In case where the control blade 30 is withdrawn from the nuclear core during the operation of the nuclear reactor, it is usually arranged to be about 15 cm. Although the length of the portion Z is usually arranged to be about ¼ to ¾ of the overall length L, the length of portions (Y+Z) may be arranged to be a length obtained by subtracting 15 cm from the overall length in a case where the control blade 30 is fully withdrawn from the operation. Furthermore, the length of the portion Y may be made to be zero.

A metal wool 46 made of Hf, Zr, stainless steel or iron is enclosed in a portion between the plug 43 and the long-lived type neutron absorbing member 41. Also a metal wool 47 is interposed between the long-lived type neutron absorbing member 41 and the boron compound mixture layer Y for the purpose of preventing the mixture of the powder boron compound with the portion around the long-lived type neutron absorbing member 41. The above-described metal wool 47 may be basically the same as the metal wool 46 placed between the plug 43 and the long life type neutron absorbing member 41. However, it is preferable that wool made of the neutron absorbing material, for example, Hf wool, be employed in a case where the length into which the metal wool 47 is enclosed is longer than about 5 mm. The reason for this lies in that, if non-absorbing material is employed, the neutron flux peak will take place in the above-described portion, causing the adjacent boron compound to be locally exposed to neutron by a large amount. As a result, the soundness for the neutron absorbing element will be deteriorated. On the other hand, the length of the layer in which the metal wool 46 is enclosed is usually made to be about 5 to 10 mm.

With the neutron absorbing rod thus-constituted, tritium produced by the boron compound can be absorbed by the Zr particles or the Hf powder mixed with the boron compound so as to prevent the diffusion of it into the long-lived type neutron absorbing member. Furthermore, since the long-lived type neutron absorbing member is surrounded by the sleeve made of pure Zr, Hf or Ti serving as a hydrogen getter or a stress absorber or a sleeve made of stainless steel serving as a stress relaxer, the stress generation in the covering pipe due to swelling can be satisfactorily prevented.

Figure 20:
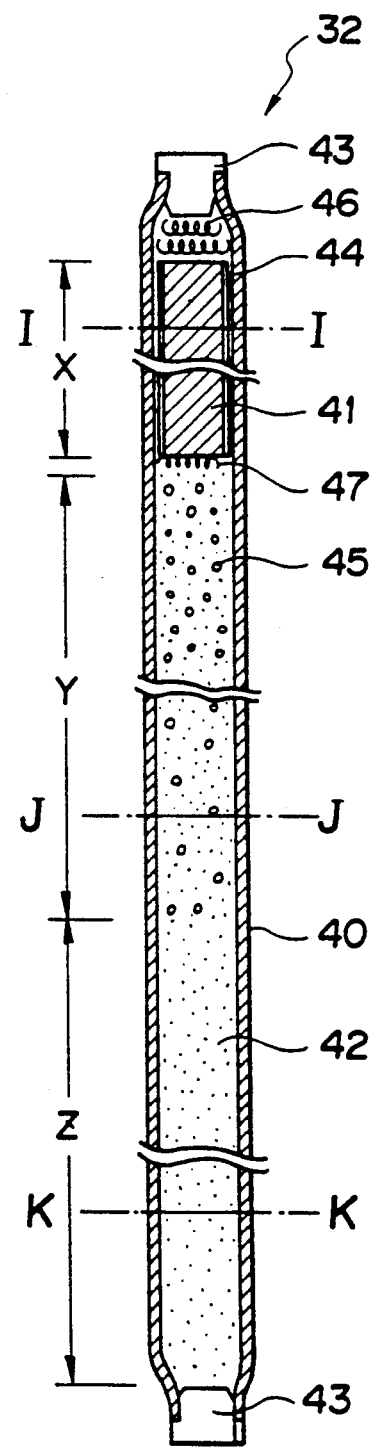
FIG. 20 is a vertical cross sectional view which illustrates the neutron absorbing rod to be included in the control blade for nuclear reactors shown in FIG. 18.
Figure 21:
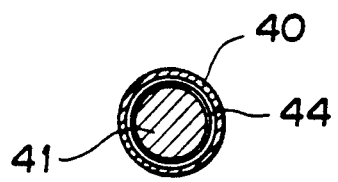
FIG. 21 is a plan cross sectional view taken along line I—I shown in FIG. 20.
Figure 22:
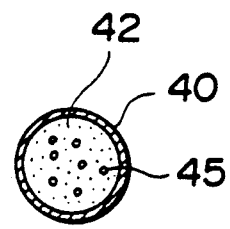
FIG. 22 is a plan cross sectional view taken along line J—J shown in FIG. 20.
Figure 23:
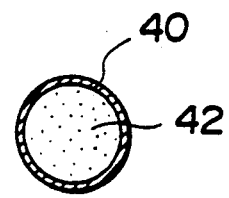
FIG. 23 is a plan cross sectional view taken along line K—K shown in FIG. 20.

FIGS. 24 to 29 respectively illustrates modifications of the portion X shown in FIG. 20, where the equivalent elements to those shown in FIG. 20 are given the same reference numerals.

Figure 24:
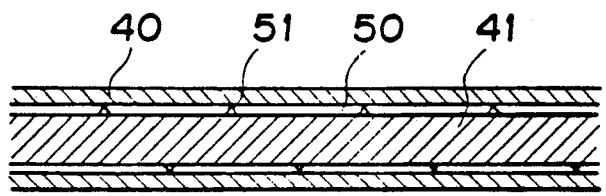
FIGS. 24 to 29 are respectively vertical cross sectional views which illustrates another modification of portion X shown in FIG. 20.

According to a first modification shown in FIG. 24, the diameter of the long-lived type neutron absorbing member 41 is, by a certain quantity, made smaller than the inner diameter of the covering pipe 40 so as to create a gap 50 between the long-lived type neutron absorbing member 41 and the covering pipe 40. Furthermore, the undesirable looseness generated due to the reduction of the diameter of the long-lived type neutron absorbing member 41 is prevented by forming a plurality of small projecting portions 51 in the portions of the long-lived type neutron absorbing member 41. As a result of the structure thus-constituted, the projecting portions 51 can be easily crushed and the generation of large stress in the covering pipe 40 can be prevented even if the long-lived type neutron absorbing member 41 generates swelling.

Figure 25:
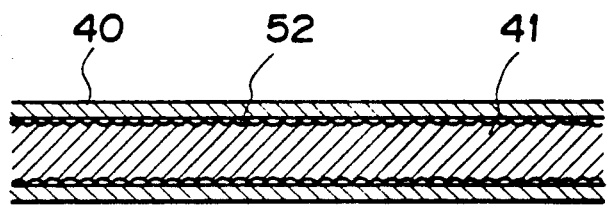

According to a second modification shown in FIG. 25, the local projecting portions 51 according to the first modification are replaced by thread type projecting portions 52 formed on the surface of the long-lived type neutron absorbing member 41. According to this modification, an effect similar to that obtainable according to the first modification can be obtained.

Figure 26:
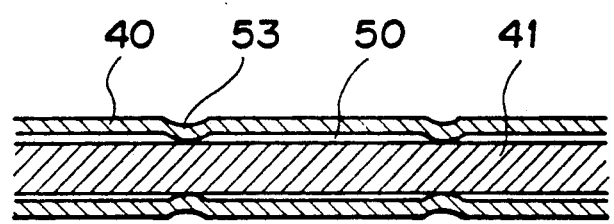

FIG. 26 illustrates a third modification which is arranged in such a manner that dimplings 53 are formed for the purpose of making the covering pipe 40 locally projecting and coming contact with the long-lived type neutron absorbing member 41. In a case where the long-lived type neutron absorbing member 41 encounters swelling, the dimplings 53 can easily restore their original shapes. Therefore, the generation of large stress cannot be generated in the covering pipe 40.

Figure 27:
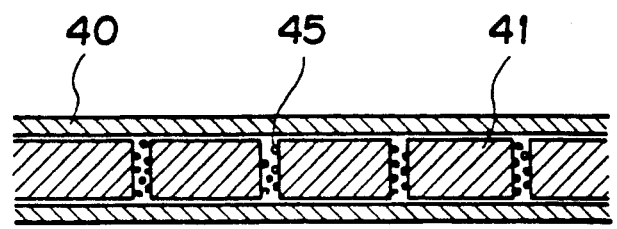

FIG. 27 illustrates a fourth modification in which the long-lived type neutron absorbing member 41 is sectioned into a multiplicity of short pieces. Furthermore, at least either the Zr or pure Zr particles or the Hf powder 45 is disposed between the pieces thus-formed. According to this modification, the Zr or pure Zr particles or the Hf powder 6 absorbs hydrogen and tritium. Therefore, the prevention of swelling in the long-lived , type neutron absorbing member 41 can be substantially prevented. Although the Zr or pure zr particles and the Hf powder 45 generates swelling, it can be present as it is in the same gap even if the swelling takes place because it is in a low density state. Therefore, the generation of large stress in the covering pipe 40 can be prevented.

Figure 28:
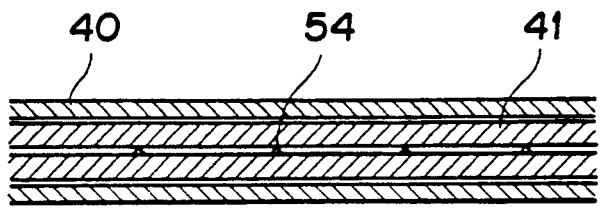

FIG. 28 illustrates a fifth modification which is arranged in such a manner that the long-lived type neutron absorbing member 41 is longitudinally divided into elongated pieces. Furthermore, small projecting portions 54 which can be easily crushed by swelling are locally formed between the elongated pieces. If swelling takes place, the small projecting portions 54 are sequentially crushed so that the generation of large stress in the covering pipe 40 can be prevented during the above-described effect. Therefore, the time at which stress is generated can be delayed considerably.

Figure 29:
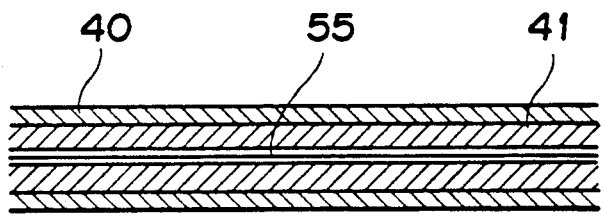

FIG. 29 illustrates a sixth modification in which the long-lived type neutron absorbing member 41 is, similarly to the fifth modification, longitudinally sectioned. Furthermore, strips 55 made of Zr or pure Zr are interposed in at least a portion of gaps between the elongated pieces. Since strip 56 made of Zr or pure Zr absorbs hydrogen, the generation of swelling in the long-lived type neutron absorbing member 41 can be substantially prevented. Although the strip 55 made of Zr or pure Zr encounters swelling, the generation of large stress in the covering pipe 40 can be satisfactorily prevented because the hardness is small and the gap will absorb the swelling.

Although omitted from illustration, a seventh modification is arranged in such a manner that an oxide film is formed on the surface of the long-lived type neutron absorbing member 41. In this case, since the oxide film prevents the hydrogen absorption, the generation of swelling in the long-lived type neutron absorbing member 41 can be prevented.

Figure 30:
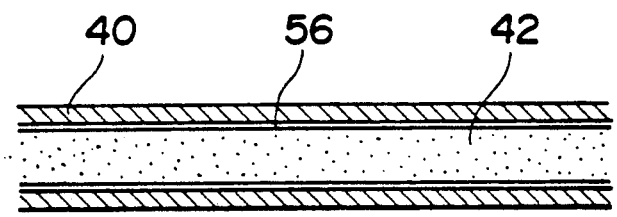
FIGS. 30 and 31 are respectively vertical cross sectional views which illustrates another modification of portion Y shown in FIG. 20.
Figure 31:
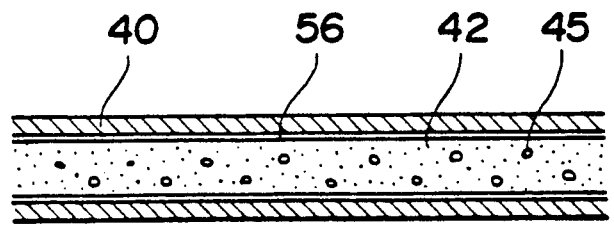

Eighth and ninth modifications are modofications about the portion Y shown in FIG. 20. FIGS. 30 and 31 respectively are vertical cross sectional views of the same.

The eighth modification shown in FIG. 30 is arranged in such a manner that the boron compound 42 enclosed in a non-sealed type inner pipe 56 made of pure Zr, Hf or stainless is accommodated in the covering pipe 40. In a case where the inner pipe 56 is made of pure Zr, the inner pipe 56 serves as a hydrogen getter and a stress relaxer, and as well as serves as a neutron absorber. The inner pipe 56 made of stainless steel simply serves as a stress relaxer by forming gaps to prevent the swelling generated due to the He gas of the boron compound. Therefore, it is preferable in this case that a mixture composed by mixing pure Zr particles (grain) or Hf powder (grain) serving as a hydrogen getter with the boron compound 42 be inserted into the inner pipe 56. As a result, diffusion of tritium generated by the boron compound 42 to the long-lived type neutron absorbing member 41 can be prevented.

Figure 32:
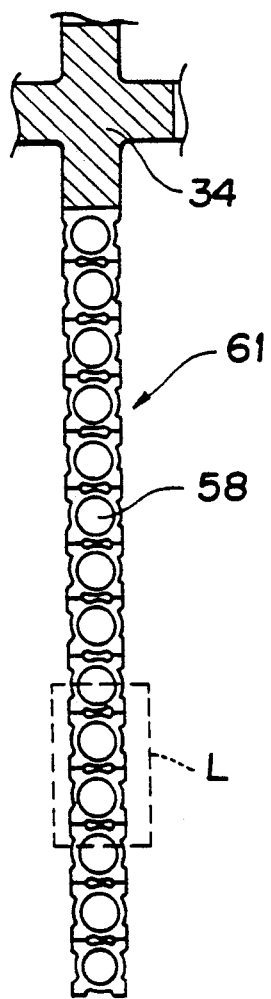
FIG. 32 is a cross sectional view which illustrates a portion of the wing for use as the control blade for boiling water nuclear reactors.
Figure 33:
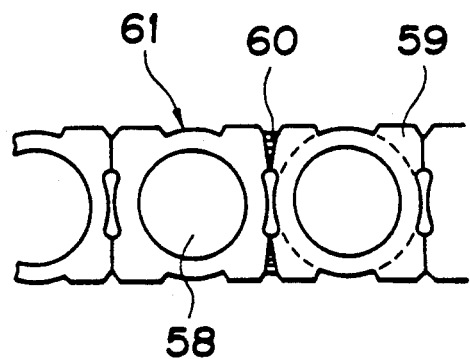
FIG. 33 is a cross sectional view which shows a portion L shown in FIG. 32.
Figure 34:
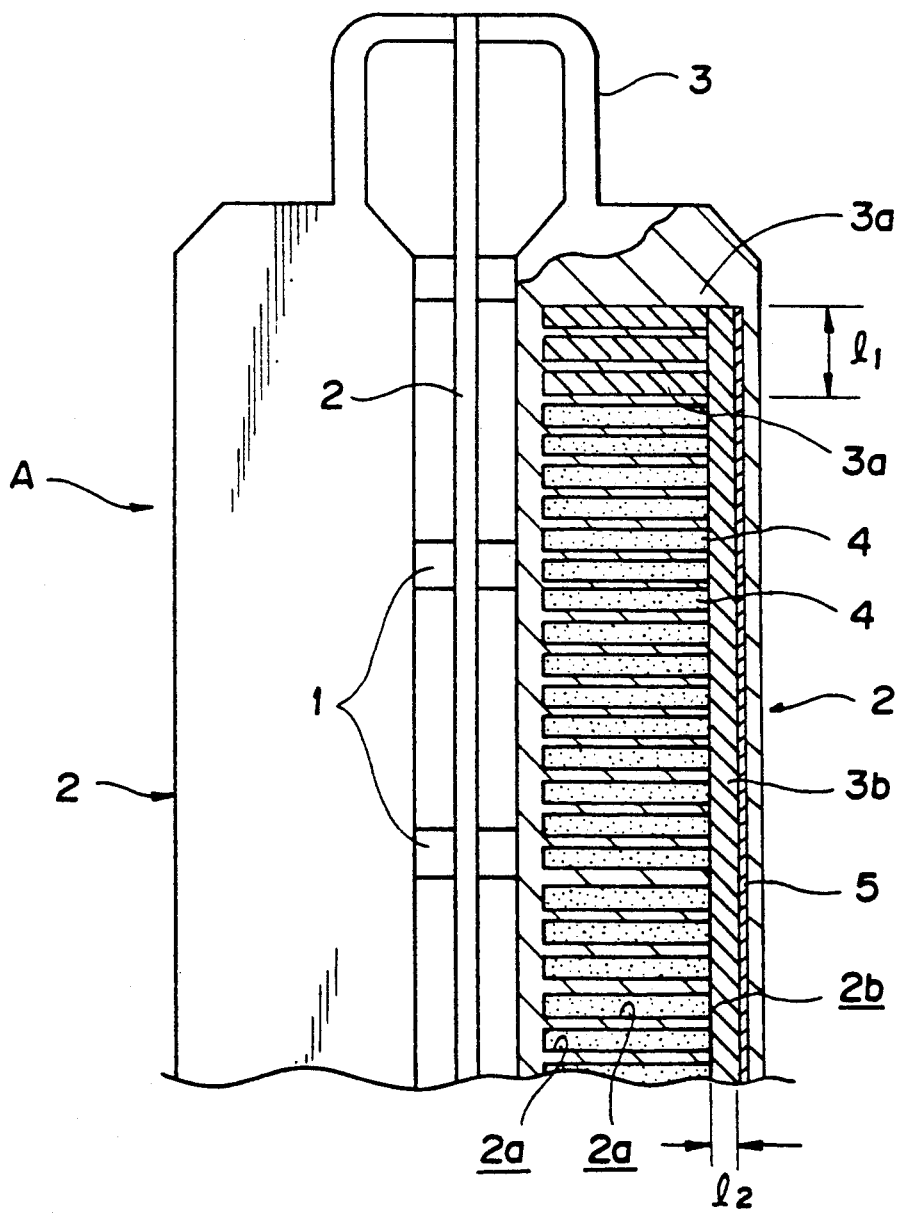
FIG. 34 is a cross sectional view which illustrates a conventional control blade for nuclear reactors;.

A control blade shown in FIG. 32 has been developed recently and disclosed in Japanese Patent Laid-Open No. 2-254895. FIG. 33 is an enlarged view of a portion L shown in FIG. 32. A neutron absorbing member charge portion 58 is formed into a circular cross section, while the outer portion of the same is formed into a substantially square shape by padding material in units of 90°. By alternately welding the pad portions 59 (to form welded portions 60), the control blade shown in FIG. 32 and having an outer shape which is substantially the same as the shape shown in FIG. 14 can be obtained. However, an apparent difference between the structure shown in FIG. 32 and that shown in FIG. 19 lies in that the sheath 33 is omitted from the structure shown in FIG. 32. Since the thickness of the wing 31 must be the same so as to be mounted on the same nuclear reactor, the diameter of the neutron absorbing member charge portion 58 can be enlarged by a quantity which corresponds to the sheath 33 omitted from the structure. Therefore, a larger amount of neutron absorber absorbers can be enclosed. As a result, the reactivity worth of the control blade for a nuclear reactor can be improved and as well as the nuclear life can be lengthened.

As shown in FIGS. 19 and 20, the structure of the neutron absorbing rod 32 can be similarly adapted to a neutron absorbing rod 61 shown in FIGS. 32 and 33 and formed into a substantially square shape.

The inventor of the present invention has disclosed the structure of an inner pipe for use as a control blade in Japanese Patent Laid-Open No. 2-2983. Although a structure for preventing the deterioration in the reactivity worth by using a neutron absorber in the plug for the inner pipe has been disclosed in Japanese Patent Laid-Open No. 2-2983, the present invention is arranged in such a manner that the pure Zr sleeve (inner pipe) serving as a hydrogen getter is used. Although a similar structure of an inner pipe has been disclosed in Japanese Patent Laid-Open No. 2-13888, the concept of the hydrogen getter is not included.

As can be understood from the above-made description, the neutron absorbing rod is constituted in such a manner that the covering pipe can be protected from excessively large stress. Therefore, a long-lived type neutron absorbing element exhibiting an extremely improved soundness can be provided.

Although the embodiments of the neutron absorbing rod according to the present invention is adapted to a control blade for use in a water boiling nuclear reactor, the present invention is not limited to this. The present invention can be adapted to a control blade for use in a pressurized water reactor. Furthermore, the structure of the neutron absorbing rod can be adapted to a control blade for use in a light water reactor, a heavy water reactor, a converter reactor or a fast breeder reactor.

Although the invention has been described in its preferred form with a certain degree of particularly, it is understood that the present disclosure of the preferred form has been changed in the details of construction and the combination and arrangement of parts may be resorted to without departing from the spirit and the scope of the invention as hereinafter claimed.

What is claimed is:

1. A control blade for use in nuclear reactors comprising:
   an upper structure means;
   a lower structure means;
   a central tie means disposed between said upper structure means and said lower structure means;
   a wing means having a plurality of wings connected to each other by said central tie means in such a manner that a plurality of said wings are disposed to form a cross-shaped lateral cross section; and
   neutron absorber means enclosed in at least a major portion of a multiplicity of accommodating holes formed in a widthwise direction of each wing and in line disposed in a lengthwise direction of said wing,
   said wing means being arranged in such a manner that each of said wings is constituted by a plate member made of hafnium metal, a hafnium alloy composed of hafnium and zirconium or titanium or an alloy the main component of which is zirconium or titanium,
   said neutron absorber menas comprising a long-lived type neutron absorber which is enclosed in said accommodating holes formed in a front insertion portion of said wing which is exposed to a large amount of neutrons and made of hafnium, metal a main component of which is hafnium, a silver-indium-cadmium alloy; and a neutron absorber which in inserted into at least a major portion of residual accommodating holes and which contains a boron compound, and
   a mixture of a material containing a boron compound and at least one hydrogen absorber composed of at least one of zirconium particles and hafnium powder being enclosed in said accommodating holes among said accommodating holes for accommodating said neutron absorber containing a boron compound disposed in a range from the front insertion portion, which is exposed to a large amount of neutrons, to $\frac{1}{4}$L of a height L of an effective core portion from the front insertion portion of a nuclear reactor, said neutron absorber means further including at least one of: a gap between said long-lived type neutron absorber and a covering pipe; a sleeve around said long-lived type neutron absorber; and an oxide film on a surface of said long-lived neutron absorber.

2. A control blade for use in nuclear reactors according to claim 1, wherein said accommodating holes formed in said wing and disposed in a range from the front insertion portion, which is exposed to a large amount of neutrons, to $\frac{1}{4}$·L are filled with said material which contains a boron compound and which is surrounded by a pure zirconium sheet.

3. A control blade for use in nuclear reactors according to claim 1, wherein said accommodating holes, which is formed in said wing and in which said long-lived type neutron absorber is enclosed, are filled with said long-lived type neutron absorber which is surrounded by a zirconium sheet.

4. A control blade for use in nuclear reactors according to claim 1, wherein said long-lived type neutron absorber to be inserted into a shape such as a thread having projections and pits on the outer surface thereof.

5. A control blade for use in nuclear reactors according to claim 1, wherein the length of said long-lived type neutron absorber to be inserted into each of said accommodating holes formed in said wing is shorter than the depth of said accommodating hole and at least a hydrogen absorber composed of at least either zirconium particles or hafnium powder is enclosed in a space of said accommodating hole in a range which corresponds to said length shortened.

6. A control blade for use in nuclear reactors according to claim 1, wherein said long-lived type neutron absorber to be inserted into each of said accommodating holes formed in said wing is divided into a plurality of short neutron absorber elements, a gap is formed in at least a portion between said neutron absorber elements and at least a hydrogen absorber composed of at least either zirconium particles or hafnium powder is charged into said gap.

7. A control blade for use in nuclear reactors according to claim 1, wherein said long-lived type neutron absorber to be inserted into each of said accommodating holes formed in said wing is longitudinally divided into a plurality of pieces in parallel to the axial direction of said accommodating hole and projecting portions are formed for the purpose of creating gaps between said pieces.

8. A control blade for use in nuclear reactors according to claim 1, wherein said long-lived type neutron absorber to be inserted into each of said accommodating holes formed in said wing is longitudinally divided into a plurality of pieces in parallel to the axial direction of said accommodating hole and zirconium strip is interposed between said pieces.

9. A control blade for use in nuclear reactors according to claim 1, wherein an oxide film is formed on the surface of said long-lived type neutron absorber to be inserted into each of said accommodating holes formed in said wing.

10. A control blade for use in nuclear reactors according to claim 1, wherein an oxide film is formed on the inner surface of said accommodating holes, in which said neutron absorber containing a boron compound is enclosed, among said accommodating holes formed in said wing.

11. A control blade for use in nuclear reactors according to claim 1, wherein at least a hydrogen absorber composed of at least either zirconium particles or hafnium powder is enclosed in at least one accommodating hole among said accommodating holes formed in a range of 3 cm or more and as well as 35 cm or shorter from the front insertion portion of said wing.

12. A control blade for use in nuclear reactors according to claim 1, wherein a zirconium tubular member is inserted to form a gas plenum into at least one accommodating hole among said accommodating holes formed in a range of 3 cm or more and as well as 35 cm or shorter from the front insertion portion of said wing.

13. A control blade for use in nuclear reactors according to claim 1, wherein a long-lived type neutron absorbing rod made of hafnium metal, metal the main component of which is hafnium or an Ag-In-Cd alloy, which extends in the lengthwise direction of said wing, is disposed on the outer portion of each of said accommodating holes disposed in a range of at least $\frac{1}{4}$·L from the front insertion portion of said wing, the major portion of said neutron absorbing rod being covered with a zirconium sleeve.

14. A control blade for use in nuclear reactors according to claim 1, wherein a long-lived type neutron absorbing rod made of hafnium metal, metal the main component of which is hafnium or an Ag-In-Cd alloy, which extends in the lengthwise direction of said wing, is disposed on the outer portion of each of said accommodating holes disposed in a range of at least $\frac{1}{4}$·L from the front insertion portion of said wing and a zirconium strip is disposed between said neutron absorbing rod and each of said accommodating holes.

15. A control blade for use in nuclear reactors according to claim 1, wherein hafnium particles are enclosed in a range of 1 to 2 cm from the outer end portion of each of said accommodating holes disposed in at least a range of $\frac{1}{4}$·L from the front insertion portion of said wing toward the inside of the wing.

16. A control blade for use in nuclear reactors according to claim 1, wherein zirconium tubular member is inserted into each of said accommodating holes among said accommodating holes formed in said wing and accommodates said neutron absorber containing a boron compound disposed at least a range of $\frac{1}{4}$·L from the front insertion portion of said wing, which is exposed to a large amount of neutrons and zirconium particles and said boron compound mixed are enclosed in said tubular member.

17. A control blade for use in nuclear reactors comprising:
an upper structure means;
lower structure means;
a central tie means for establishing a connection between said upper structure means and said lower structure means;
a sheath plate means connected to said central tie means and having a U-shaped lateral cross section to constitute wings disposed to form a cross-shaped lateral cross section; and
a neutron absorber rod means accommodated in said sheath plate means in line, wherein said neutron absorber rod means is constituted by inserting said long-lived type neutron absorber made of hafnium metal, metal the main component of which is hafnium or a silver-indium-cadmium (Ag-In-Cd) alloy into a covering pipe said neutron absorber rod means further including at least one of: a gap between said long-lived type neutron absorber and said covering pipe; a sleeve around said long-lived type neutron absorber; and an oxide film on a surface of said long-lived neutron absorber.

18. A control blade for use in nuclear reactors according to claim 17, wherein said neutron absorber rod means is inserted into a predetermined region in said covering pipe in such a manner that a boron compound is mixed with at least a hydrogen absorber composed of at least either zirconium particles or hafnium powder.

19. A neutron absorbing rod comprising:
an elongated covering pipe;
a plug means for sealing two end portions of said covering pipe; and
a neutron absorber means accommodated in said covering pipe,
said neutron absorber means comprising a long-lived type neutron absorber enclosed in one side of said covering pipe, which is exposed to a large amount of neutrons, and made of hafnium metal, alloy a main component of which is hafnium or a silver-indium-cadmium alloy and a neutron absorber enclosed in a residual region and composed of a boron compound, and wherein said long-lived type neutron absorber is enclosed in said covering pipe and wherein said neutron absorber means further includes at least one of: a gap between said long-lived type neutron absorber and said covering pipe; a sleeve around said long-lived type neutron absorber; and an oxide film on a surface of said long-lived neutron absorber.

20. A neutron absorbing rod according to claim 19, wherein a hydrogen absorber composed of at least either zirconium particles or hafnium powder is mixed and enclosed with said neutron absorber among said neutron absorbers composed of said boron compound to be enclosed in said covering pipe in a predetermined region, which is exposed to a large amount of neutrons.

21. A neutron absorbing rod according to claim 19, wherein said neutron absorber, among said neutral absorbers composed of said boron compound to be enclosed in said covering pipe, in a predetermined region which is exposed to a large amount of neutrons is enclosed in an unsealed type inner pipe accommodated in said covering pipe.

22. The control blade of claim 17, wherein a gap is provided between said long-lived type neutron absorber and said covering pipe, and wherein said long-lived type neutron absorber comprises a rod having at least one of a plurality of projections and a thread formed thereon, thereby maintaining said gap between said long-lived type neutron absorber and said covering pipe.

23. The control blade of claim 17, wherein a gap is provided between said long-lived type neutron absorber and said covering pipe, and wherein said covering pipe includes a plurality of inward projections disposed upon an inner surface thereof, thereby maintaining said gap between said long-lived type neutron absorber and said covering pipe.

24. The control blade of claim 19, wherein a gap is provided between said long-lived type neutron absorber and said covering pipe, and wherein said long-lived type neutron absorber comprises a rod having at least one of a plurality of projections and a thread formed thereon, thereby maintaining said gap between said long-lived type neutron absorber and said covering pipe.

25. The control blade of claim 19, wherein a gap is provided between said long-lived type neutron absorber and said covering pipe, and wherein said covering pipe includes a plurality of inward projections disposed upon an inner surface thereof, thereby maintaining said gap between said long-lived type neutron absorber and said covering pipe.

26. A control blade for use in nuclear reactors comprising:
an upper structure means;
a lower structure means;
a central tie means disposed between said upper structure means and said lower structure means;
a wing means having a plurality of wings connected to each other by said central tie means in such a manner that a plurality of said wings are disposed to form a cross-shaped lateral cross section;
said wing means including at least first, second, third and fourth regions, and wherein said second through fourth regions include accommodating holes formed in a widthwise direction of each wing; and
wherein said second region includes at least one of said accommodating holes having a tubular member inserted therein, said tubular member formed of zirconium.

27. The control blade of claim 26, wherein said first region includes at least one accommodating hole having a tubular member disposed therein formed of zirconium, and wherein said at least one accommodating hole of said second region further includes zirconium disposed inside of said tubular member.

28. The control blade of claim 27, wherein said third region includes a plurality of said accommodating holes, and wherein said plurality of accommodating holes of said third region include zirconium tubular members disposed therein and a long-lived neutron absorber rod disposed inside of said zirconium tubular member.

29. The control blade of claim 28, wherein said fourth region includes a plurality of accommodating holes having a high reactivity neutron absorber and zirconium disposed therein.

30. The control blade of claim 26, wherein said third region includes a plurality of said accommodating holes, and wherein said plurality of accommodating holes of said third region include zirconium tubular members disposed therein and a long-lived neutron absorber rod disposed inside of said zirconium tubular member.

31. The control blade of claim 30, wherein said fourth region includes a plurality of accommodating holes having a high reactivity neutron absorber and zirconium disposed therein.

32. The control blade of claim 31, wherein said first through fourth regions extend along a length of said control blade which is in the range of $\frac{1}{4}L$ to $\frac{3}{4}L$ of a height L of an effective core portion from a front insertion portion of a nuclear reactor, and wherein said control blade further includes a fifth region having a plurality of accommodating holes disposed therein, and wherein accommodating holes of said fifth region contain a boron compound.

* * * * *